United States Patent
Ohguro

(10) Patent No.: US 11,509,033 B2
(45) Date of Patent: Nov. 22, 2022

(54) ISOLATOR

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Tatsuya Ohguro, Nonoichi Ishikawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/004,986

(22) Filed: Aug. 27, 2020

(65) Prior Publication Data
US 2021/0305671 A1    Sep. 30, 2021

(30) Foreign Application Priority Data
Mar. 24, 2020    (JP) .............................. JP2020-052523

(51) Int. Cl.
*H04B 1/40*    (2015.01)
*H01P 1/36*    (2006.01)
(Continued)

(52) U.S. Cl.
CPC ................. *H01P 1/36* (2013.01); *H04B 1/04* (2013.01); *H04B 1/16* (2013.01); *H04B 1/40* (2013.01)

(58) Field of Classification Search
CPC ... H01F 5/00; H01F 5/04; H01F 27/28; H01L 5/04; H01L 23/28; H01L 27/088; H01L 27/146; H01L 29/06; H01L 29/08; H01L 29/10; H01L 29/66; H01L 29/78; H01L 29/243; H01L 49/02; H01P 1/36; H01P 5/18; H04B 1/04; H04B 1/16; H04B 1/40; H04B 15/00
(Continued)

(56) References Cited

U.S. PATENT DOCUMENTS 6,437,418 B1    8/2002 Ferrari et al.
8,466,535 B2    6/2013 Hopper et al.
(Continued)

FOREIGN PATENT DOCUMENTS

JP    2011-054800 A    3/2011
JP    2011-233807 A    11/2011
(Continued)

OTHER PUBLICATIONS

Notice of Reasons for Refusal dated Aug. 29, 2022 in corresponding Japanese Patent Application No. 2020-052523, with English translation, 8 pages.

*Primary Examiner* — Shawkat M Ali
(74) *Attorney, Agent, or Firm* — Kim & Stewart LLP

(57) ABSTRACT

An isolator includes an insulating layer, a first electrode provided on a first side of the insulating layer, and a second electrode provided on a second side of the insulating layer opposite to the first side. The second electrode faces the first electrode across the insulating layer. The insulating layer includes therein a gap between the first electrode and the second electrode. The gap extends along a plane perpendicular to a thickness direction of the insulating layer.

20 Claims, 25 Drawing Sheets

(51) Int. Cl.
*H04B 1/04* (2006.01)
*H04B 1/16* (2006.01)

(58) Field of Classification Search
USPC ......... 257/43, 288, 291, 316, 368, 737, 758;
307/91, 104; 336/65, 200, 232; 375/219,
375/295, 316
See application file for complete search history.

(56) References Cited

U.S. PATENT DOCUMENTS

| | | |
|---|---|---|
| 10,002,700 B2 | 6/2018 | Lan et al. |
| 2008/0030080 A1* | 2/2008 | Chen ....................... H01L 23/60 |
| | | 307/91 |
| 2010/0148911 A1* | 6/2010 | Fouquet ............. H01F 27/2804 |
| | | 336/200 |
| 2011/0049693 A1 | 3/2011 | Nakashiba et al. |
| 2015/0004902 A1 | 1/2015 | Pigott et al. |

FOREIGN PATENT DOCUMENTS

| | | |
|---|---|---|
| JP | 2015-012614 A | 1/2015 |
| JP | 2016-522566 A | 7/2016 |

\* cited by examiner

FIG. 3
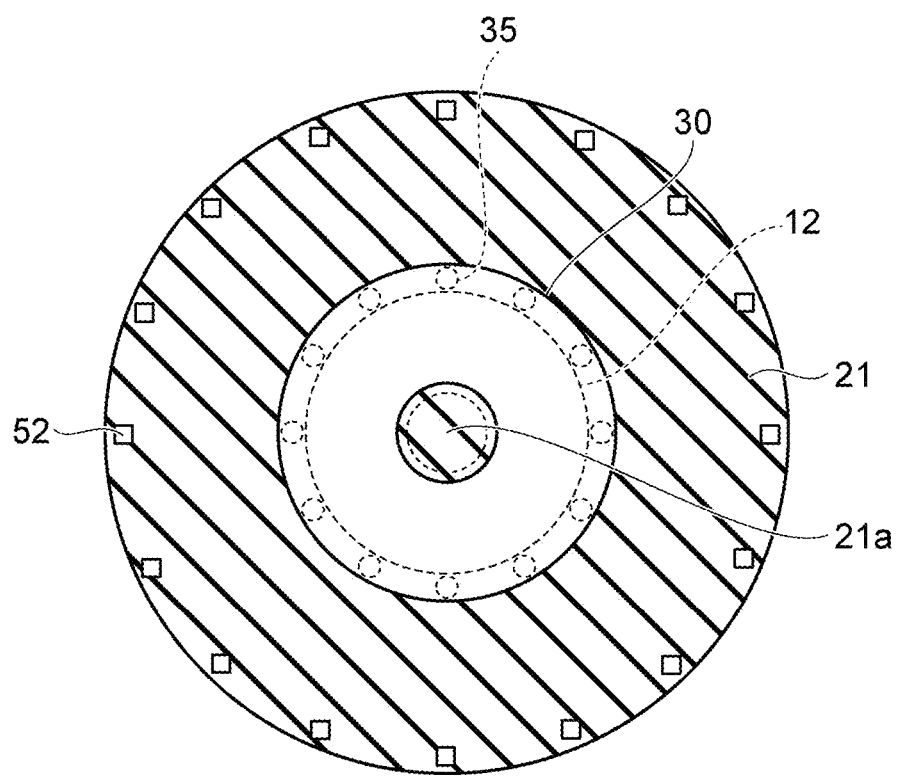
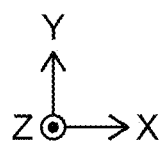

FIG. 10
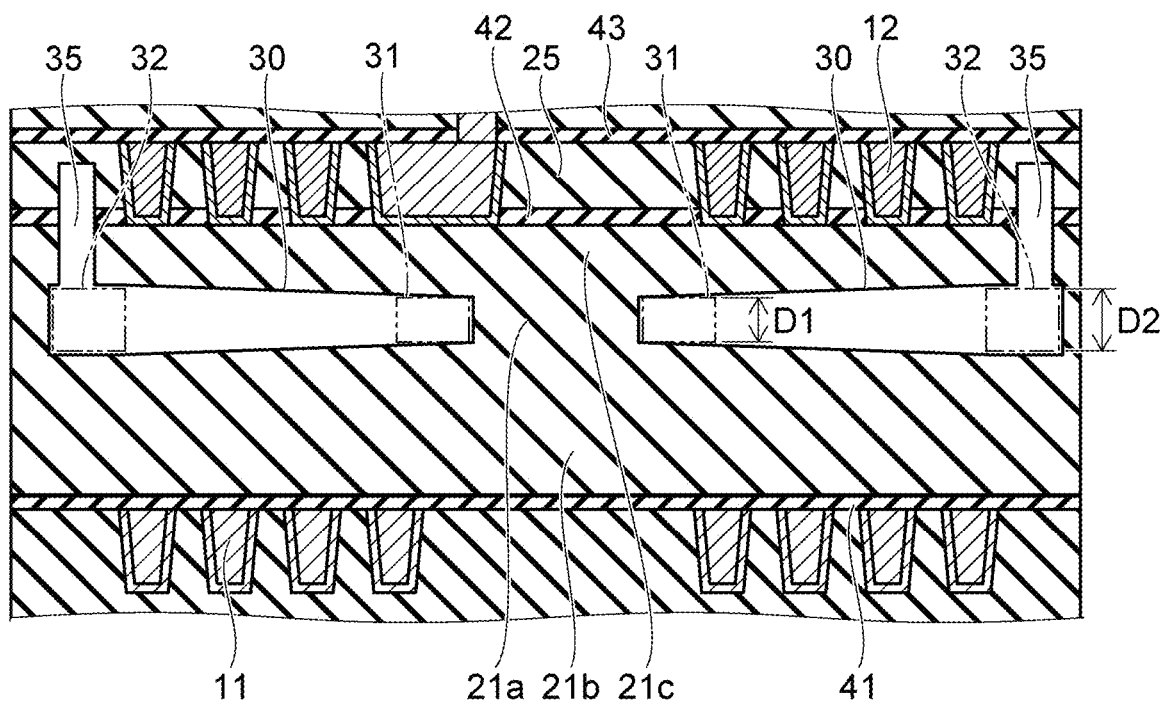
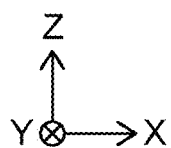

FIG. 12
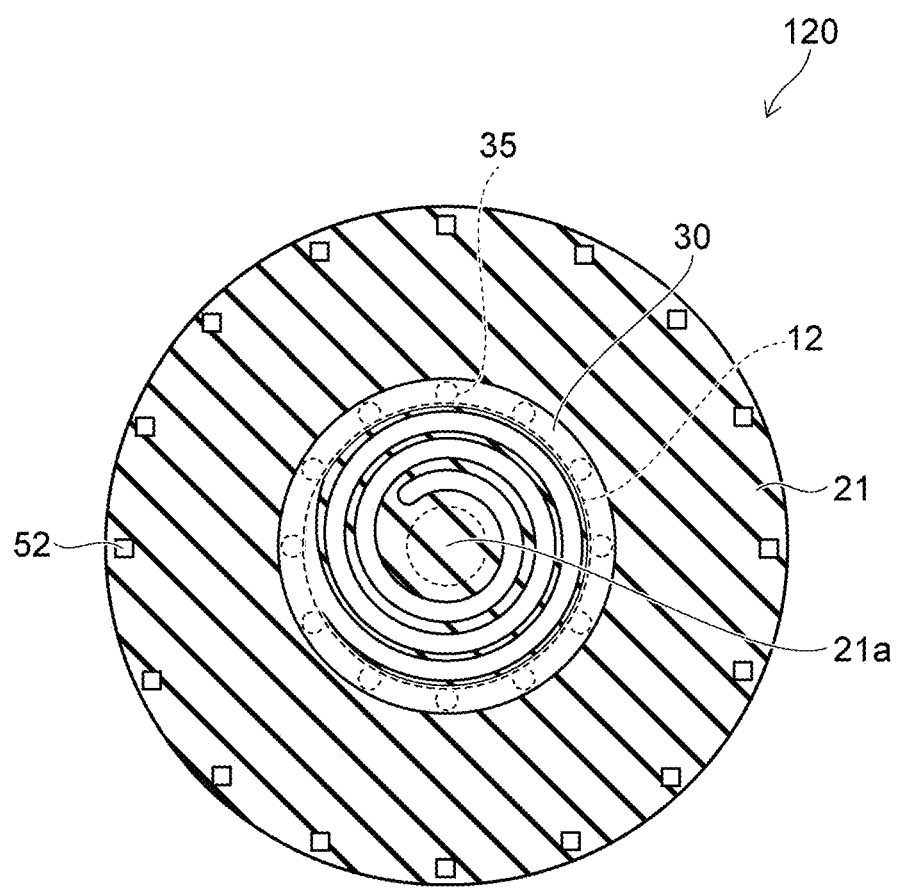
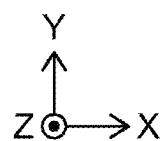

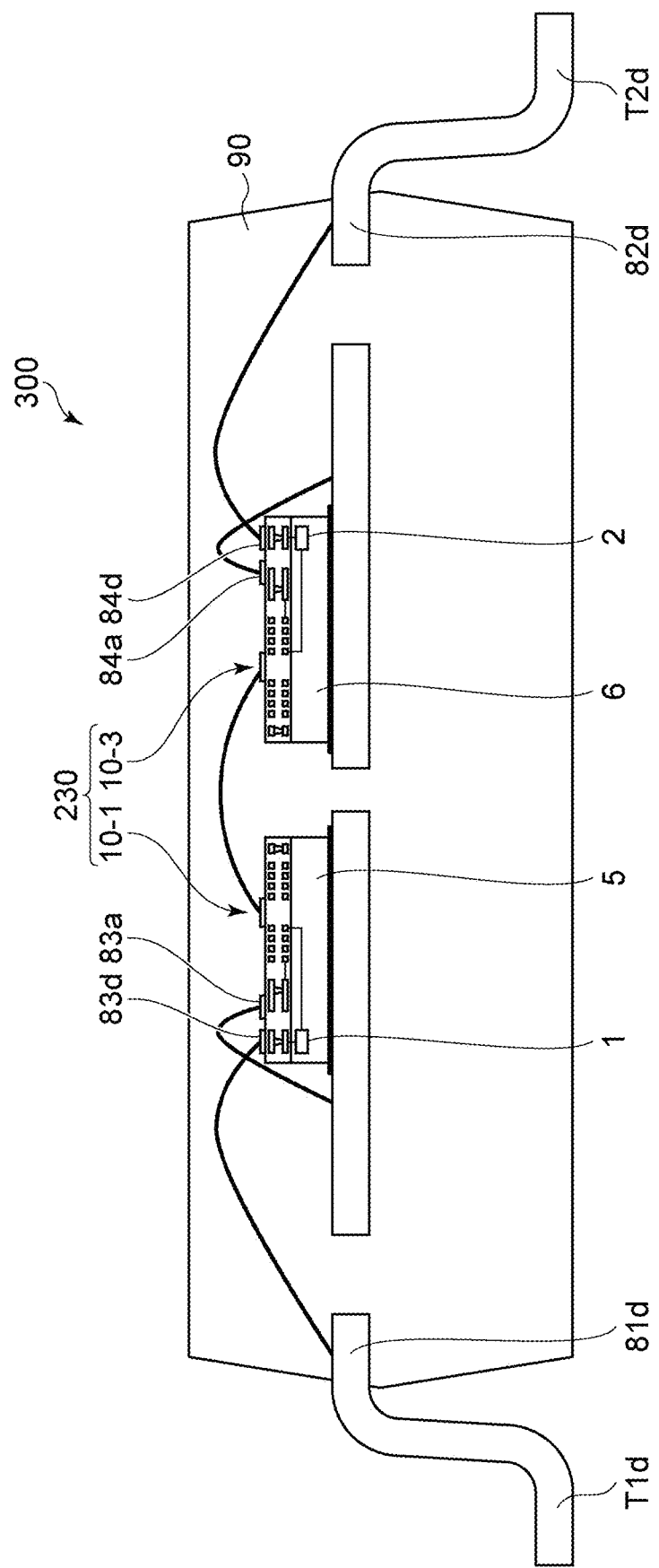

ISOLATOR

CROSS-REFERENCE TO RELATED APPLICATION(S)

This application is based upon and claims the benefit of priority from Japanese Patent Application No. 2020-052523, filed on Mar. 24, 2020, the entire contents of which are incorporated herein by reference.

FIELD

Embodiments described herein relate generally to an isolator.

BACKGROUND

An isolator transmits a signal using a change in magnetic field or electric field without transmitting or passing a current from a signal input side to a signal output side. An isolator may also be referred to as a signal coupler or more particularly an insulated signal coupler. Improved characteristics are required for isolators.

BRIEF DESCRIPTION OF THE DRAWINGS

FIG. 3 is a cross-sectional view of an isolator taken along a line III-III in FIG. 2.

FIG. 10 is a cross-sectional view of a part of an isolator according to a first embodiment.

FIG. 12 is a cross-sectional view of a part of an isolator according to a modification example of the first embodiment.

FIG. 25 is a schematic diagram illustrating a cross-sectional structure of a packaged device according to a third embodiment.

DETAILED DESCRIPTION

Figure 1:
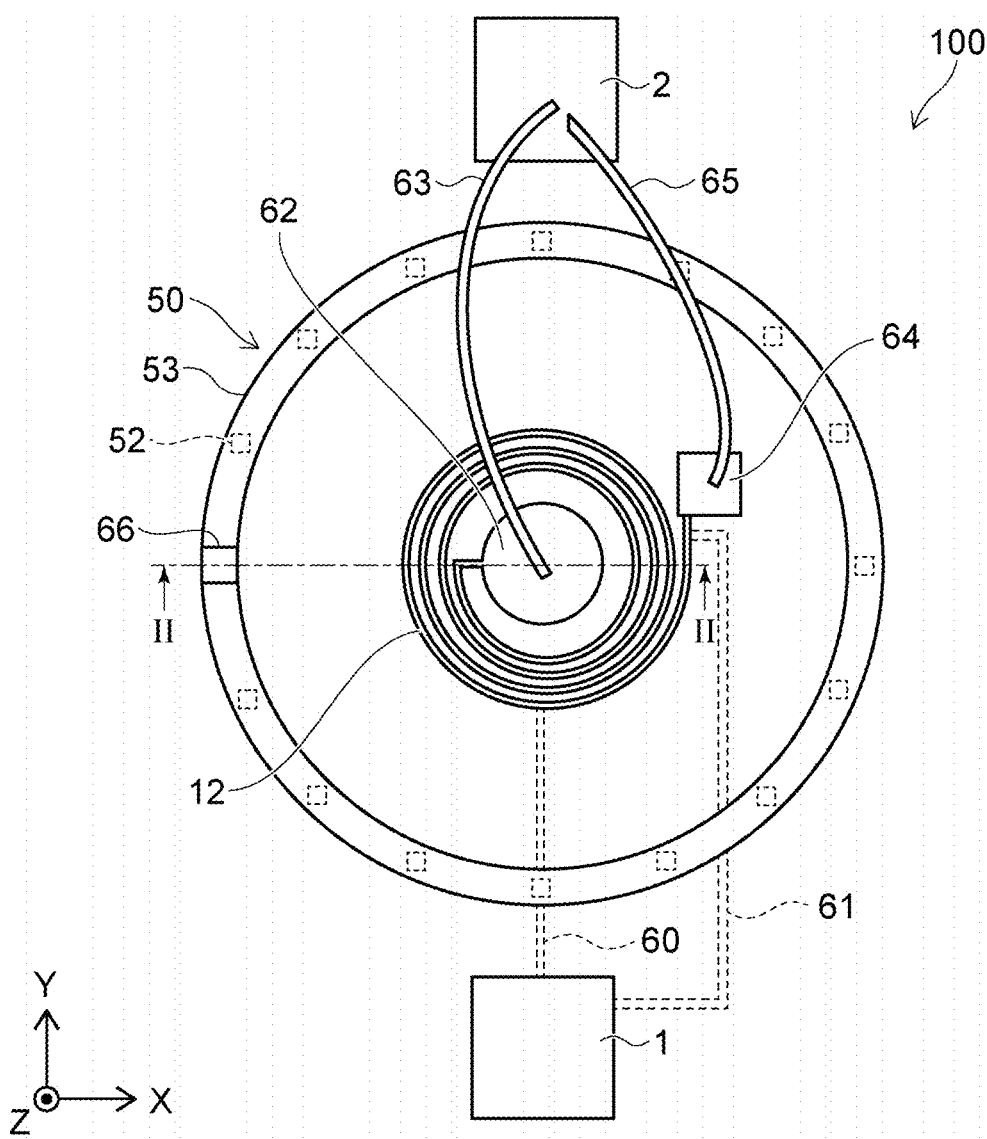
FIG. 1 is a plan view of an isolator according to a first embodiment.

In general, according to an embodiment, an isolator includes an insulating layer, a first electrode provided on a first side of the insulating layer, and a second electrode provided on a second side of the insulating layer opposite to the first side. The second electrode faces the first electrode across the insulating layer. The insulating layer includes therein a gap between the first electrode and the second electrode. The gap extends along a plane perpendicular to a thickness direction of the insulating layer.

Hereinafter, certain example embodiments of the present disclosure will be described with reference to the drawings.

The drawings are schematic and/or conceptual, as such any relationship between the thickness and the width of each depicted component, a ratio between the sizes of components, and the like are not necessarily the same as the actual ones. When the same component is shown in different drawings, a dimension or a ratio of the component may vary depending on the drawings.

In this specification and each of the drawings, those components which are substantially the same are represented by the same reference numerals, and the detailed description thereof may not be repeated.

Figure 2:
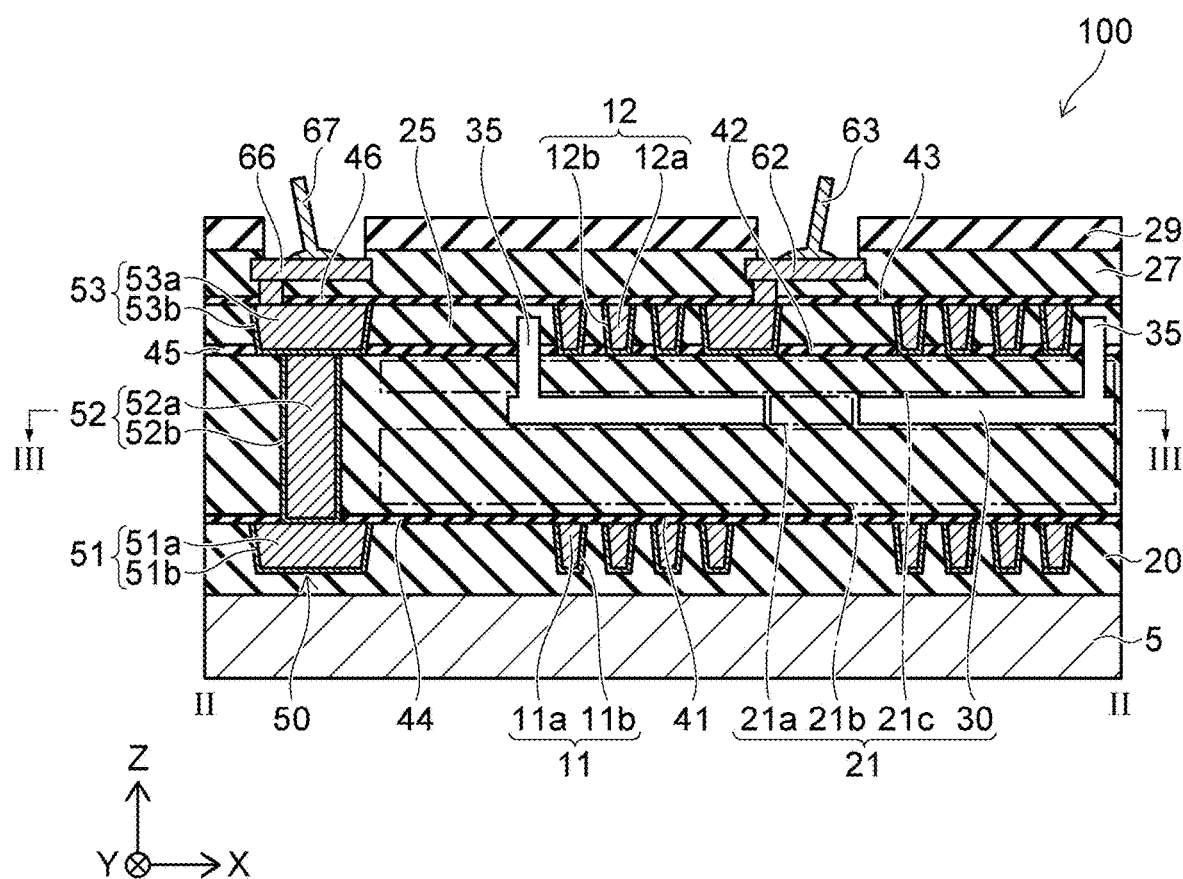
FIG. 2 is a cross-sectional view of an isolator taken along a line II-II in FIG. 1.

FIG. 1 is a plan view of an isolator according to a first embodiment. FIG. 2 is a cross-sectional view of the isolator taken along a line II-II in FIG. 1.

The isolator according to the present embodiment and the following embodiments relates to a device that is referred to as a digital isolator, a galvanic isolator, a galvanic insulating element, or the like.

As illustrated in FIG. 1 and/or FIG. 2, an isolator 100 according to a first embodiment includes a first circuit 1, a second circuit 2, a substrate 5, a first electrode 11, a second electrode 12, a first insulating portion 21, an insulating portion 25, an insulating portion 27, an insulating portion 29, insulating layers 41 to 46, and a conductor 50.

In the description of the present and following embodiments, the XYZ orthogonal coordinate system is used. A direction from the first electrode 11 toward the second electrode 12 will be referred to as "Z direction (first direction)". The Z direction may be referred to as a thickness direction or a top-to-bottom direction. Two directions that are perpendicular to the Z direction and are orthogonal to each other will be referred to as "X direction (second direction)" and "Y direction (third direction)". In addition, for convenience of description, the direction from the first electrode 11 toward the second electrode 12 will be referred to as "upward", and a direction opposite to the direction will be referred to as "downward". These directions are based on a relative positional relationship between the first electrode 11 and the second electrode 12 need not have any relation to the gravity direction.

As illustrated in FIG. 2, the insulating portion 20 is provided above the substrate 5. The first electrode 11 is provided in the insulating portion 20. The first insulating portion 21 is provided above the first electrode 11. The second electrode 12 is provided above the first insulating portion 21. The second electrode 12 is electrically isolated from the first electrode 11.

The first insulating portion 21 includes a first insulating region 21a and a gap 30, which may be referred to as a cavity. The first insulating region 21a may be referred to as a center region. The gap 30 is provided between the first electrode 11 and the second electrode 12. In addition, the gap 30 is positioned around the first insulating region 21a along an X-Y surface perpendicular to the Z direction.

The first insulating portion 21 may further include a second insulating region 21b and a third insulating region 21c. The second insulating region 21b is provided below the first insulating region 21a and the gap 30. The third insulating region 21c is provided above the first insulating region 21a and the gap 30.

The insulating layer 41 is provided between the first electrode 11 and the first insulating portion 21. For example, the insulating layer 41 is in contact with the first electrode 11. The insulating layer 42 is provided around the bottom of the second electrode 12 along the X-Y surface. The insulating portion 25 is provided above the insulating layer 41. The insulating portion 25 is positioned around the second electrode 12 along the X-Y surface. The insulating layer 43 is provided above the second electrode 12. For example, the insulating layer 43 is in contact with the second electrode 12.

For example, a part of the insulating portion 20 is provided inside the first electrode 11. A part of the insulating portion 25 is provided inside the second electrode 12. The first insulating region 21a is positioned between the part of the insulating portion 20 and the part of the insulating portion 25 in the Z direction.

In the example illustrated in FIGS. 1 and 2, the first electrode 11 and the second electrode 12 are coils that are provided in a spiral shape along the X-Y surface. The first electrode 11 and the second electrode 12 face each other in the Z direction. At least a part of the second electrode 12 is aligned with at least a part of the first electrode 11 in the Z direction.

The conductor 50 is provided around the first electrode and the second electrode 12 along the X-Y surface. Specifically, the conductor 50 includes a first conductive portion 51, a second conductive portion 52, and a third conductive portion 53. The first conductive portion 51 is provided around the first electrode 11 along the X-Y surface. The second conductive portion 52 is provided above a part of the first conductive portion 51. A plurality of second conductive portions 52 are provided along the first conductive portion 51. The third conductive portion 53 is provided above the second conductive portions 52. The third conductive portion 53 is positioned around the second electrode 12 along the X-Y surface.

The insulating layer 44 is provided around the bottom of the second conductive portion 52 along the X-Y surface. For example, the insulating layer 44 is in contact with another part of the first conductive portion 51 and the second conductive portion 52. The insulating layer 44 is provided continuous to the insulating layer 41. Alternatively, the insulating layer 44 may be provided around the insulating layer 41 along the X-Y surface to be distant from the insulating layer 41.

The insulating layer 45 is provided around the bottom of the third conductive portion 53. The insulating layer 45 is provided continuous to the insulating layer 42. Alternatively, the insulating layer 45 may be provided around the insulating layer 42 along the X-Y surface to be distant from the insulating layer 42.

The insulating layer 46 is provided above the third conductive portion 53. For example, the insulating layer 46 is in contact with the third conductive portion 53. The insulating layer 46 is provided continuous to the insulating layer 43. Alternatively, the insulating layer 46 may be provided around the insulating layer 42 along the X-Y surface to be distant from the insulating layer 43.

In isolator 100, as illustrated in FIG. 1, one end (a first end) of the first electrode 11 is electrically connected to the first circuit 1 through a wiring 60. The other end (a second end) of the first electrode 11 is electrically connected to the first circuit 1 through a wiring 61.

As illustrated in FIGS. 1 and 2, a first end of the second electrode 12 is electrically connected to a pad 62. A first end of the wiring 63 is joined to the pad 62. The first end of the second electrode 12 is electrically connected to the second circuit 2 through the pad 62 and the wiring 63.

A second end of the second electrode 12 is electrically connected to the pad 64. A first end of the wiring 65 is joined to the pad 64. The second end of the second electrode 12 is electrically connected to the second circuit 2 through the pad 64 and the wiring 65.

For example, the pad 62 is provided above the first end of the second electrode 12. The pad 64 is provided on the second end of the second electrode 12. Alternatively, a position of the pad 62 in the Z direction and a position of the pad 64 in the Z direction may be the same as a position of the second electrode 12 in the Z direction. The pads 62 and 64 may be integrated with the second electrode 12.

As illustrated in FIG. 2, a pad 66 is provided above the conductor 50. The conductor 50 is electrically connected to a conductive member through the pad 66 and a wiring 67. For example, the conductor 50 and the substrate 5 are connected to a reference potential. The reference potential is, for example, a ground potential. As a result, the conductor 50 can be prevented from being at a floating potential. The possibility of unexpected dielectric breakdown between the conductor 50 and each of the electrodes due to a variation in the potential of the conductor 50 can be reduced. In addition, the first circuit 1 may be provided above the substrate 5. In this case, by providing the conductor 50 above the first circuit 1, the conductor 50 blocks transmission of electromagnetic waves from the outside of the substrate 5 and the conductor 50 toward the first circuit 1. As a result, the operation of the first circuit 1 can be further stabilized.

The insulating portion 27 is provided around the pads 62 and 66 along the X-Y surface. The insulating portion 29 is provided above the insulating portion 27. The pads 62, 64, and 66 are exposed to the outside without being covered with the insulating portions 27 and 29.

One or more holes 35 may be provided in the third insulating region 21c. The one or more holes 35 extend in the Z direction and is connected to the gap 30. The one or more holes 35 are closed by being covered with, for example, at least one of the insulating portion 25, the insulating portion 27, and the insulating layer 43.

One of the first circuit 1 and the second circuit 2 is used as a transmitter circuit. Another one of the first circuit 1 and the second circuit 2 is used as a receiver circuit. Here, a case where the first circuit 1 is a transmitter circuit and the second circuit 2 is a receiver circuit will be described.

The first circuit 1 transmits a signal (e.g., a current signal) having a waveform suitable for transmission to the first electrode 11. When a current flows through the first electrode 11, a magnetic field that passes through the inside of the first electrode 11 having a spiral shape is generated. At least a part of the first electrode 11 is aligned with at least a part of the second electrode 12 in the Z direction. A part of the generated magnetic line of force passes through the inside of the second electrode 12. Due to a change in magnetic field in the second electrode 12, an induced electromotive force is generated in the second electrode 12 such that a current flows through the second electrode 12. The second circuit 2 detects the current flowing through the second electrode 12 and generates a signal corresponding to the detection result. As a result, a signal is transmitted between the first electrode 11 and the second electrode 12 even though no current passes between first electrode 11 and second electrode 12, that is the first electrode 11 and the second electrode 12 are insulated from each other.

An example of a material of each of the components in the isolator 100 will be described.

The substrate 5 is, for example, a silicon substrate. For example, impurities are added to the substrate 5 such that the substrate 5 is conductive.

The first electrode 11, the second electrode 12, the conductor 50, the pad 62, the pad 64, and the pad 66 include metal. For example, the first electrode 11, the second electrode 12, the conductor 50, the pad 62, the pad 64, and the pad 66 include metal selected from the group consisting of copper and aluminum. In order to inhibit heat generation in the first electrode 11 and the second electrode 12 during signal transmission, it is preferable that electrical resistances of these components are low. From the viewpoint of reducing electrical resistance, it is preferable that the first electrode 11, the second electrode 12, the conductor 50, the pad 62, the pad 64, and the pad 66 include aluminum or copper.

The insulating portion 20, the first insulating portion 21, the insulating portion 25, and the insulating portion 27 include silicon and oxygen. For example, the insulating portion 20, the first insulating portion 21, the insulating portion 25, and the insulating portion 27 include silicon oxide. The insulating portion 20, the first insulating portion 21, the insulating portion 25, and the insulating portion 27 may further include nitrogen. The insulating portion 29 includes an insulating resin such as polyimide or polyamide.

The wirings 63, 65, and 67 include metal such as aluminum.

The insulating layers 41 to 46 include silicon and nitrogen. For example, the insulating layers 41 to 46 include silicon nitride. By providing the insulating layers 41, 43, 44, and 46, the metal material in the first electrode 11, the second electrode 12, and the conductor 50 can be inhibited from being diffused to an adjacent insulating portion. In addition, by providing the insulating layer 41, leakage current between the first electrode 11 and the second electrode 12 can be reduced.

The first electrode 11 may include metal layers 11a and 11b. The metal layer 11b is provided between the metal layer 11a and the insulating portion 20. The second electrode 12 may include metal layers 12a and 12b. The metal layer 12b is provided between the metal layer 12a and the first insulating portion 21 and between the metal layer 12a and the insulating portion 25. The metal layers 11a and 12a include copper. The metal layers 11b and 12b include tantalum. The metal layers 11b and 12b may include a stacked film including tantalum and tantalum nitride. By providing the metal layers 11b and 12b, the metal material in the metal layers 11a and 12a can be inhibited from being diffused to an adjacent insulating portion.

The first conductive portion 51 may include metal layers 51a and 51b. The metal layer 51b is provided between the metal layer 51a and the insulating portion 20. The second conductive portion 52 may include metal layers 52a and 52b. The metal layer 52b is provided between the metal layer 52a and the first insulating portion 21 and between the metal layer 52a and the first conductive portion 51. The third conductive portion 53 may include metal layers 53a and 53b. The metal layer 53b is provided between the metal layer 53a and the first insulating portion 21, between the metal layer 53a and the insulating portion 25, and between the metal layer 53a and the second conductive portion 52. The metal layers 51a to 53a include copper. The metal layers 51b to 53b include tantalum. The metal layers 51b to 53b may include a stacked film including tantalum and tantalum nitride. By providing the metal layers 51b to 53b, the metal material in the metal layers 51a to 53a can be inhibited from being diffused to an adjacent insulating portion.

FIG. 3 is a cross-sectional view of the isolator taken along a line III-III in FIG. 2.

In FIG. 3, a position of the second electrode 12 on the X-Y surface is represented by a broken line. In addition, a position of the hole 35 on the X-Y surface is represented by a broken line.

As illustrated in FIG. 3, when seen from the Z direction, a plurality of holes 35 is positioned outside the second electrode 12. When seen from the Z direction, the holes 35 are aligned around the second electrode 12 along the X-Y surface.

For example, the inner circumference of the second electrode 12 represented by the broken line overlaps the first insulating region 21a in the Z direction. The outer circumference of the second electrode 12 represented by the broken line overlaps the gap 30 in the Z direction. In FIG. 3, the gap 30 has a loop shape. In the isolator 100, the first electrode 11 and the second electrode 12 face each other in the Z direction. Therefore, as in the second electrode 12, the inner circumference of the first electrode 11 overlaps the first insulating region 21a in the Z direction. The outer circumference of the first electrode 11 overlaps the gap 30 in the Z direction. In other words, a part of the first insulating region 21a is positioned between the inner circumference of the first electrode 11 and the inner circumference of the second electrode 12 in the Z direction. A part of the gap 30 is positioned between the outer circumference of the first electrode 11 and the outer circumference of the second electrode 12 in the Z direction.

FIGS. 4A to 8 are cross-sectional diagrams to illustrate a method of manufacturing the isolator according to the first embodiment.

An example of the method of manufacturing the isolator according to the first embodiment will be described with reference to FIGS. 4A to 8. FIGS. 4A to 8 illustrate the manufacturing step at a position represented by line II-II in FIG. 1.

Figure 4A:
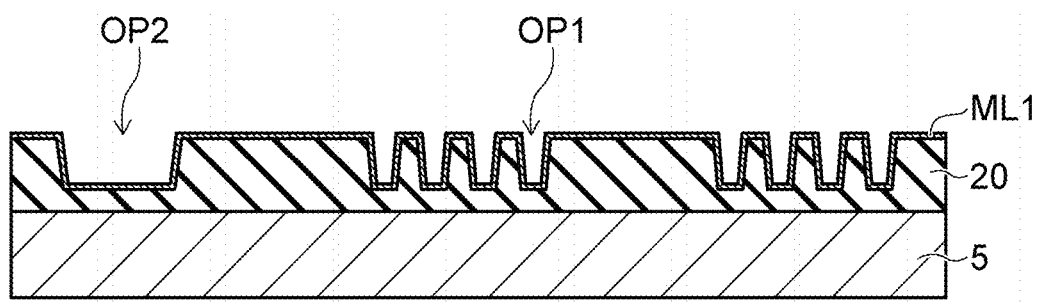
FIGS. 4A to 4C are cross-sectional views illustrating aspects of a method of manufacturing an isolator according to a first embodiment.

The substrate 5 is prepared. The insulating portion 20 is formed on the substrate 5 by chemical vapor deposition (CVD). Openings OP1 and OP2 are formed on an upper surface of the insulating portion 20 by reactive ion etching (RIE). The opening OP1 is formed at a position corresponding to the first electrode 11. The opening OP2 is formed at a position corresponding to the first conductive portion 51. As illustrated in FIG. 4A, a metal layer ML1 is formed by CVD along the upper surface of the insulating portion 20 in which the openings OP1 and OP2 are formed.

Figure 4B:
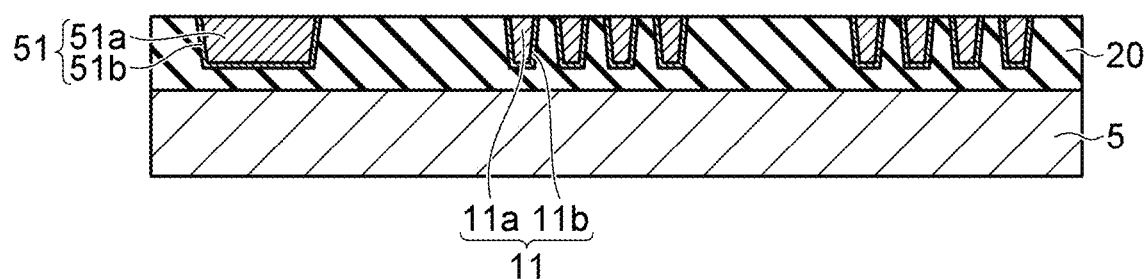

Another metal layer that is embedded into the openings OP1 and OP2 is formed on the metal layer ML1 by sputtering and plating. Chemical mechanical polishing (CMP) is performed until the upper surface of the insulating portion 20 is exposed. As illustrated in FIG. 4B, the metal layer ML1 and the other metal layer are divided into a plurality of portions such that the first electrode 11 and the first conductive portion 51 are formed.

Figure 4C:
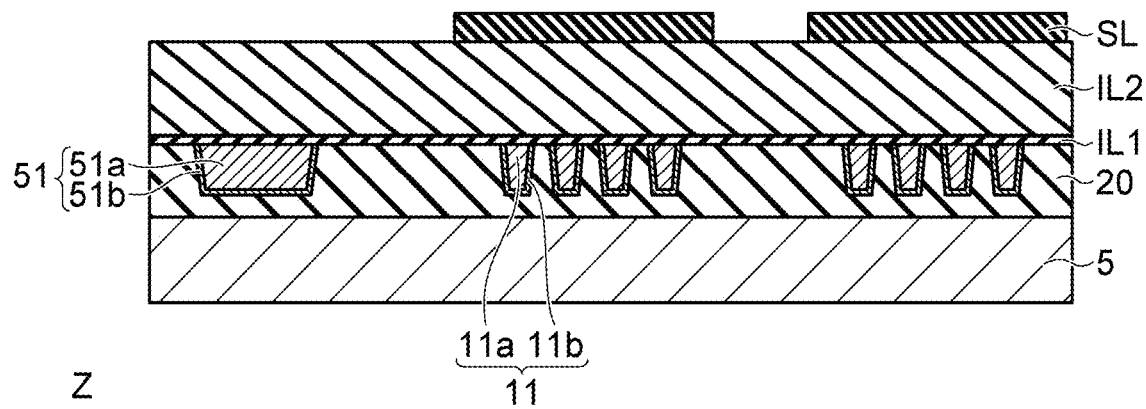

An insulating layer IL1 is formed by CVD on the first electrode 11 and the first conductive portion 51. The insulating layer IL1 includes silicon nitride. An insulating layer IL2 is formed by CVD on the insulating layer IL1. A sacrificial layer SL is formed on the insulating layer IL2. As illustrated in FIG. 4C, the sacrificial layer SL is patterned. The sacrificial layer SL is patterned according to a position and a shape of the gap 30. The patterned sacrificial layer SL is positioned on the first electrode 11. An insulating layer IL3 covering the sacrificial layer SL is formed on the insulating layer IL2.

Materials of the insulating layer IL2, the insulating layer IL3, and the sacrificial layer SL are selected such that the sacrificial layer SL can be selectively removed from the insulating layers IL1 and IL2 in a subsequent step. For example, the insulating layers IL2 and IL3 include silicon oxide. The sacrificial layer SL includes silicon and germanium. Alternatively, the sacrificial layer SL may include porous silicon. The sacrificial layer SL may include carbon.

Figure 5A:
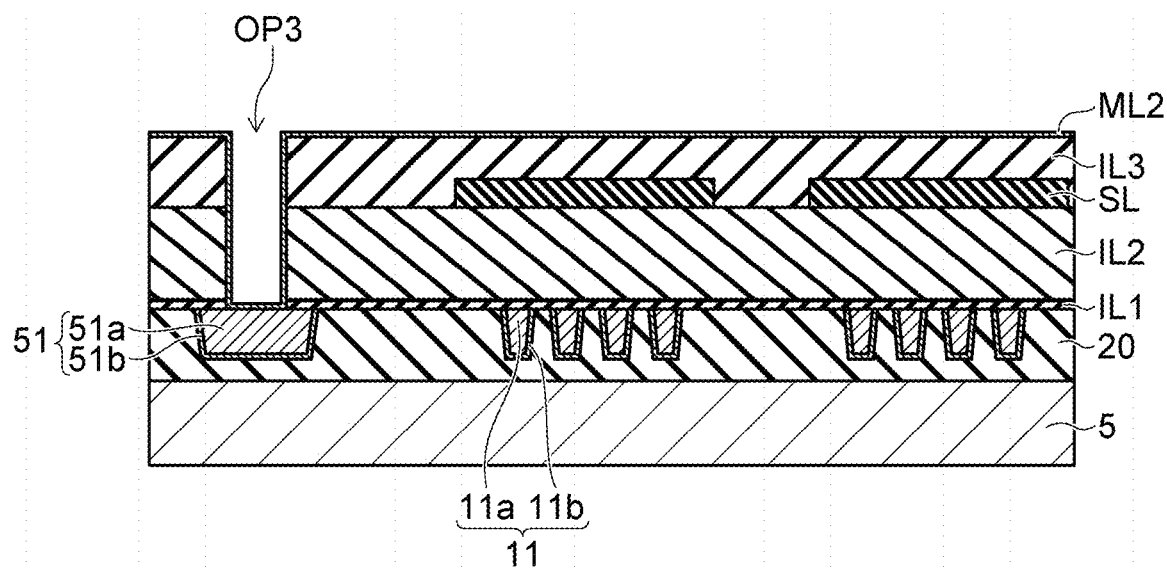
FIGS. 5A and 5B are cross-sectional views illustrating aspects of a method of manufacturing an isolator according to a first embodiment.

An opening OP3 that penetrates the insulating layers IL1 to IL3 and reaches the first conductive portion 51 is formed by RIE. As illustrated in FIG. 5A, a metal layer ML2 is formed by sputtering along an upper surface of the insulating layer IL3 and an inner surface of the opening OP3.

Figure 5B:
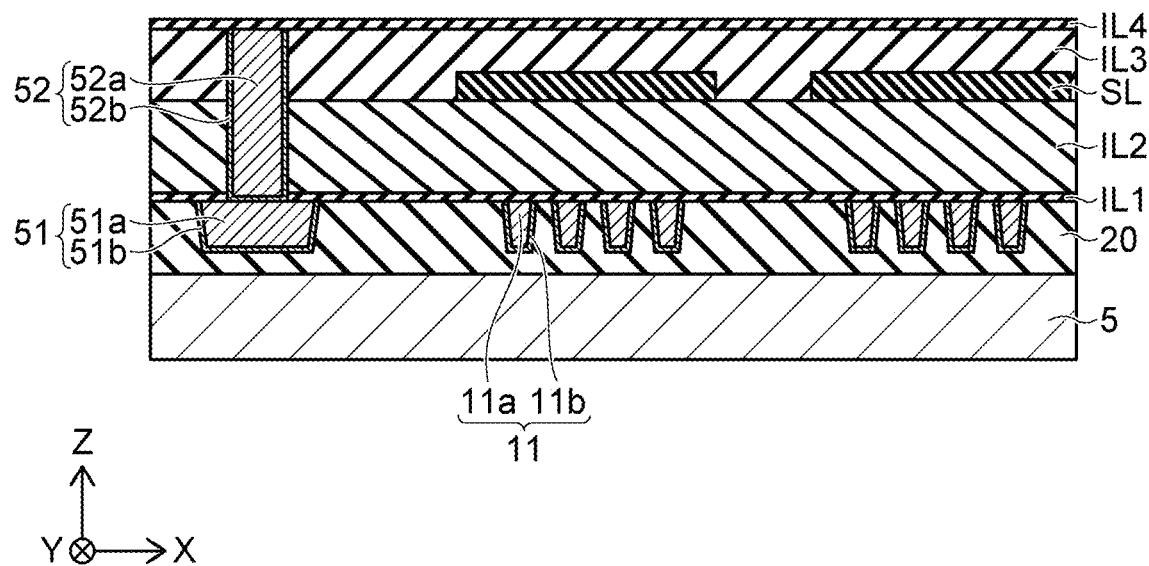

Another metal layer that is embedded into the opening OP3 is formed on the metal layer ML2 by sputtering and plating. CMP is performed until the upper surface of the insulating layer IL3 is exposed. As a result, the second conductive portion 52 is formed. As illustrated in FIG. 5B, an insulating layer IL4 is formed by CVD on the insulating layer 113 and the second conductive portion 52.

Figure 6A:
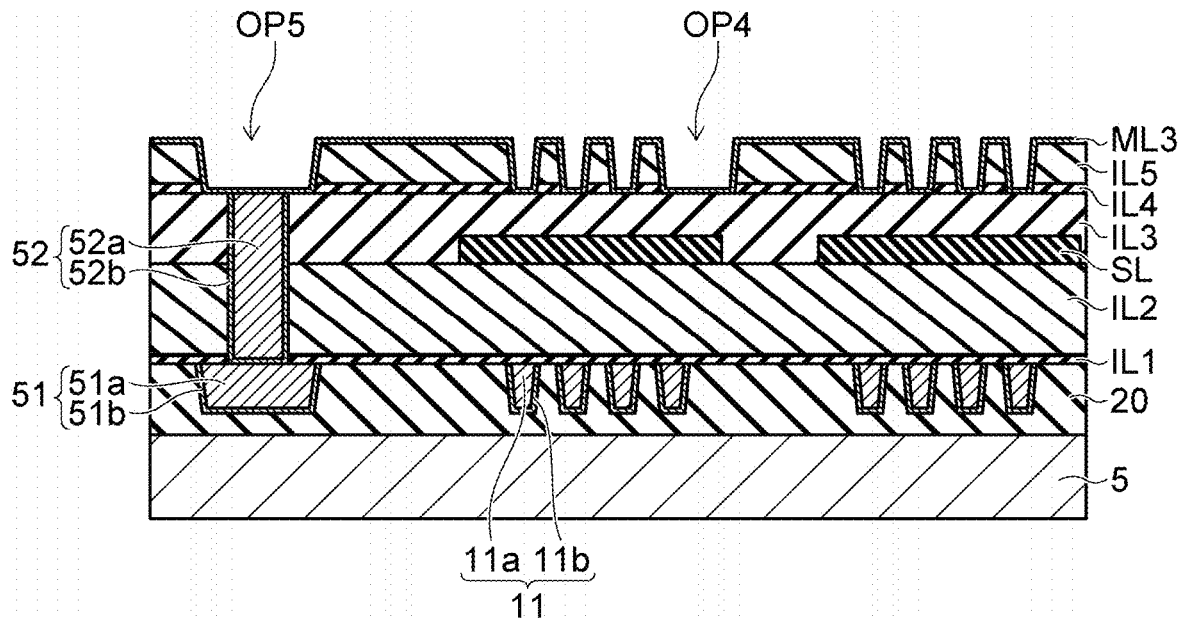
FIGS. 6A and 6B are cross-sectional views illustrating aspects of a method of manufacturing an isolator according to a first embodiment.

An insulating layer IL5 is formed by CVD on the insulating layer IL4. Openings OP4 and OP5 that penetrate the insulating layers IL4 and IL5 are formed by RIE. At this time, the insulating layer IL4 functions as a stopper. The opening OP4 is formed at a position corresponding to the second electrode 12 and is positioned on the first electrode 11. The opening OP5 is formed at a position corresponding to the first conductive portion 51 and is positioned on the second conductive portion 52. The second conductive portion 52 is exposed through the opening OP5. As illustrated in FIG. 6A, a metal layer ML3 is formed along an inner surface of the opening OP1, an inner surface of the opening OP2, and an upper surface of the insulating layer IL5.

Figure 6B:
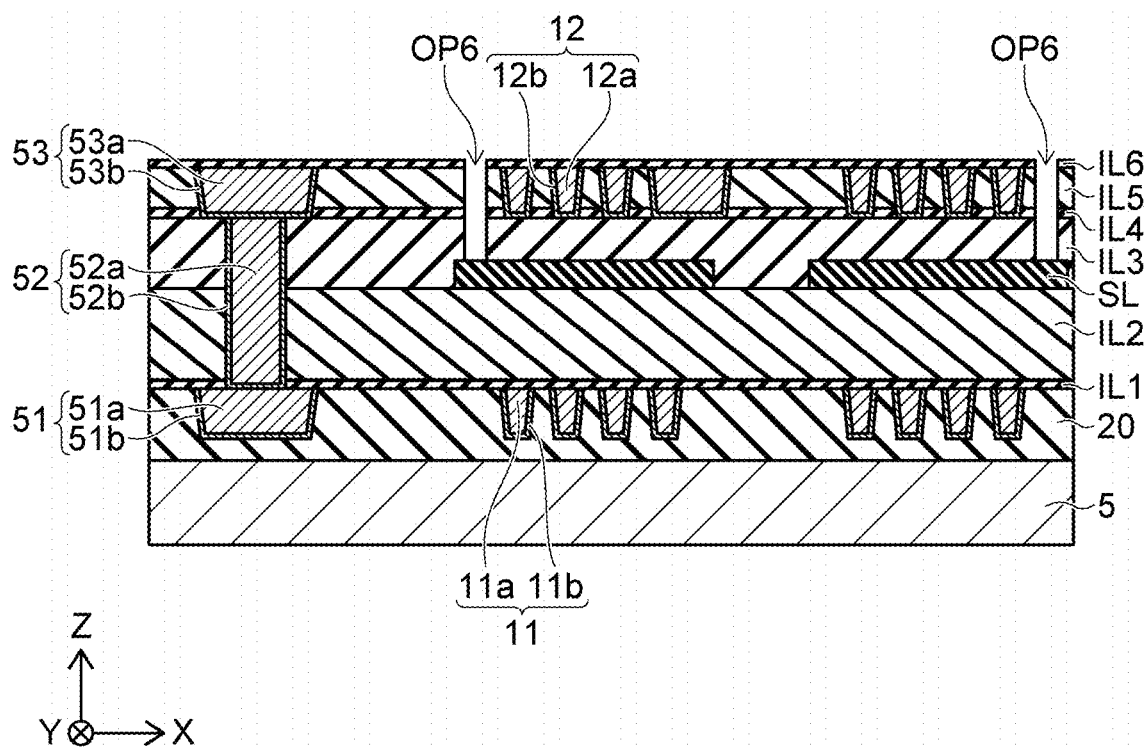

Another metal layer that is embedded into the openings OP4 and OP5 is formed on the metal layer ML3 by sputtering and plating. CMP is performed until the upper surface of the insulating layer IL5 is exposed. As a result, the metal layer ML3 and the other metal layer are divided into a plurality of portions such that the second electrode 12 and the third conductive portion 53 are formed. As illustrated in FIG. 6B, an insulating layer IL6 is formed by CVD on the second electrode 12 and the third conductive portion 53.

Figure 7A:
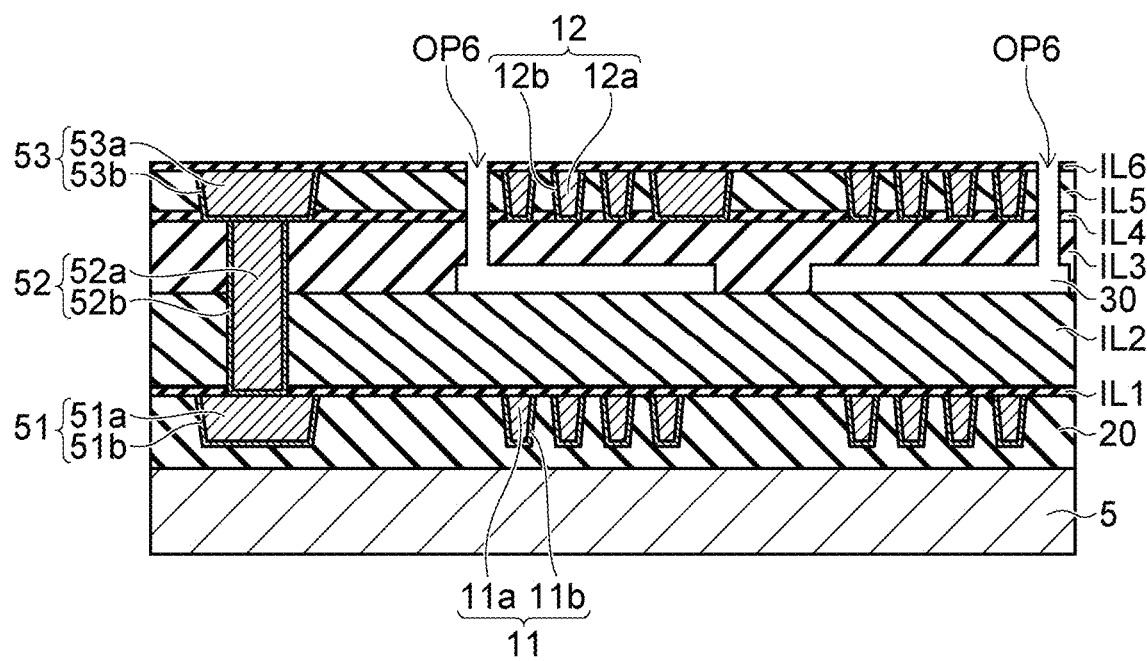
FIGS. 7A and 7B are cross-sectional views illustrating aspects of a method of manufacturing an isolator according to a first embodiment.

As illustrated in FIG. 6B, a plurality of openings OP6 that penetrate the insulating layers IL3 to IL6 are formed around the second electrode 12. The sacrificial layer SL is exposed through the opening OP6. The sacrificial layer SL is removed by isotropic etching such as chemical dry etching (CDE) or wet etching. Gas or chemicals are supplied to the sacrificial layer SL through the opening OP6. As illustrated in FIG. 7A, the gap 30 is formed by selectively removing the sacrificial layer SL while inhibiting etching on the insulating layers IL2 and IL3.

When the sacrificial layer SL includes carbon, the sacrificial layer SL is removed by asking using oxygen plasma. By exposing the sacrificial layer SL to high-energy oxygen (oxygen radicals), carbon dioxide is released through a reaction of carbon and oxygen such that the sacrificial layer SL is decomposed. When the sacrificial layer SL is removed by wet etching, an amine chemical or a chemical of N-methyl-2-pyrrolidone (NMP) is used.

When the sacrificial layer SL includes silicon and germanium, mixed gas including argon gas and oxygen gas, mixed gas including argon gas and hydrogen gas, or a chromic acid-sulfuric acid aqueous solution may be used in order to remove the sacrificial layer SL. When the sacrificial layer SL includes porous silicon, at least one gas selected from the group consisting of fluorine, chlorine, and bromine, a mixed solution including nitric acid and hydrofluoric acid, or a chromic acid-sulfuric acid aqueous solution may be used in order to remove the sacrificial layer SL.

Figure 7B:
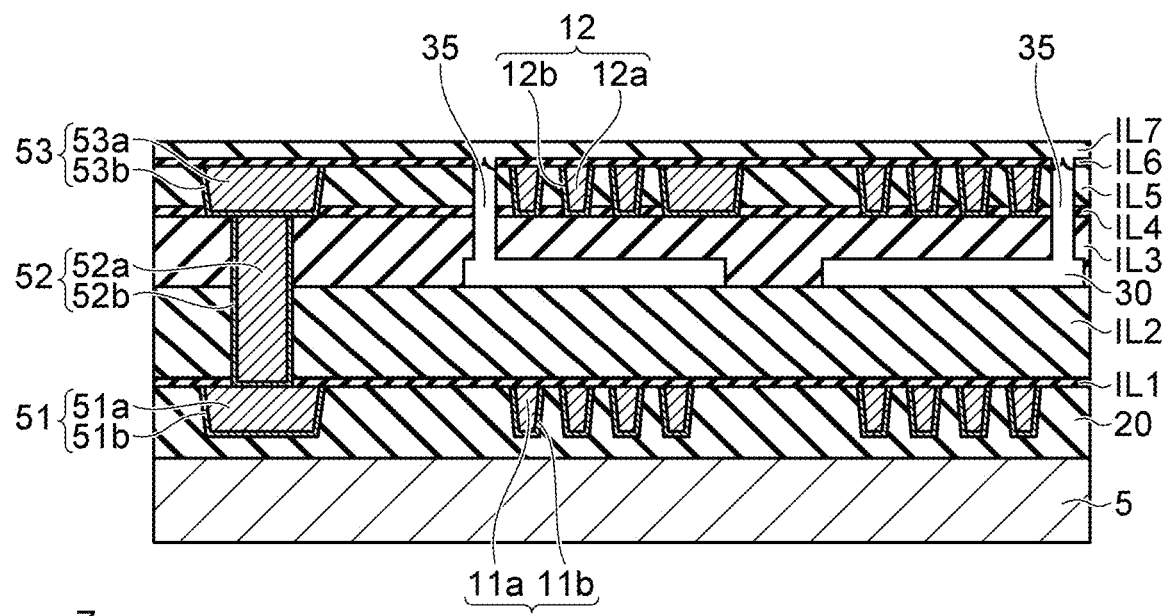

As illustrated in FIG. 7B, an insulating layer IL7 that blocks the opening OP6 is formed on the insulating layer IL6 by CVD. At this time, the insulating layer IL7 inhibits deposition of the material on the gap 30. For example, by using a condition or a material having a poor step coverage, an upper end of the opening OP6 is likely to be blocked, and the deposition of the material on the gap 30 is inhibited. The opening OP6 in which the upper end is blocked remains as the hole 35.

Figure 8:
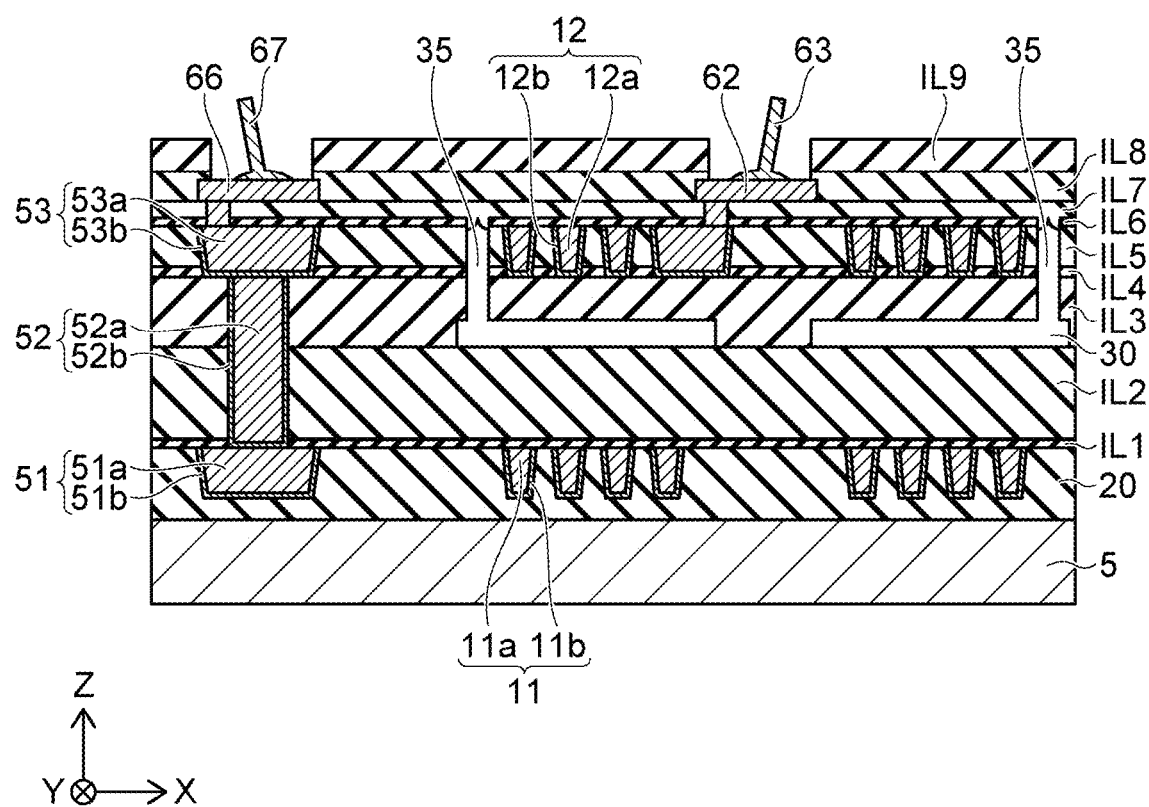
FIG. 8 is a cross-sectional view illustrating aspects of a method of manufacturing an isolator according to a first embodiment.

The pad 62, the pad 66, and the pad 64 are formed on the insulating layer IL7. An insulating layer IL8 that covers the respective pads is formed by CVD and is patterned. As illustrated in FIG. 8, an insulating layer IL9 is formed by applying a resin to the insulating layer IL8 and curing the applied resin. Wirings are connected to the respective pads. Through the above-described steps, the isolator 100 is manufactured.

The insulating layer IL1 in FIG. 8 corresponds to the insulating layers 41 and 44 in FIG. 2. The insulating layer IL2 corresponds to the second insulating region 21b. A part of the insulating layer IL3 surrounded by the gap 30 along the X-Y surface corresponds to the first insulating region 21a. Another part of the insulating layer IL3 positioned above the gap 30 corresponds to the third insulating region 21c. The insulating layer IL4 corresponds to the insulating layers 42 and 45. The insulating layer IL5 corresponds to the insulating portion 25. The insulating layer IL6 corresponds to the insulating layers 43 and 46. The insulating layers IL7 and IL8 correspond to the insulating portion 27. The insulating layer IL9 corresponds to the insulating portion 29.

The effects of the first embodiment will be described.

For the isolator, it is desired that a magnetic coupling between the first electrode 11 and the second electrode 12 is higher and a signal can be transmitted between the first electrode 11 and the second electrode 12 without loss. That is, it is desirable that common mode transient immunity (CMTI) is high. In order to improve CMTI, it is preferable that the distance between the first electrode 11 and the second electrode 12 in the Z direction is short. As the distance decreases, the magnetic coupling between the first electrode 11 and the second electrode 12 becomes stronger. On the other hand, as the distance decreases, the capacitance between the first electrode 11 and the second electrode 12 increases. During signal transmission, noise caused by capacitance is generated in the first electrode 11 and the second electrode 12. Therefore, as the capacitance increases, CMTI decreases.

In the isolator 100 according to the first embodiment, the gap 30 is provided between the first electrode 11 and the second electrode 12. The relative dielectric constant of the gap 30 is lower than the relative dielectric constant of another insulating material such as silicon oxide or silicon nitride. By providing the gap 30, the capacitance between the first electrode 11 and the second electrode 12 is lower than that when the insulating material is provided over the entire region between the first electrode 11 and the second electrode 12. In the first embodiment, CMTI can be improved while inhibiting an increase in capacitance. Alternatively, the size of each of the first electrode 11 and the second electrode 12 on the X-Y surface can be reduced while maintaining CMTI. As a result, the size of the isolator 100 can be miniaturization.

In addition, by providing the gap 30, the path of leakage current flowing between the first electrode 11 and the second electrode 12 can be narrowed. Therefore, the leakage current in the isolator 100 can be reduced.

When the gap 30 is provided, the strength (physical resistance to breakage/deformation) of the isolator 100 may decrease. Regarding this issue, in the isolator 100, the first insulating portion 21 between the first electrode 11 and the second electrode 12 includes the first insulating region 21a. By providing the first insulating region 21a, the strength of the isolator 100 can be improved. In addition, the first insulating region 21a is positioned inside the gap 30 along the X-Y surface. According to this position relationship, the strength in the region between the first electrode 11 and the second electrode 12 can be improved as a whole, and any locally significant decrease in strength in the region can be limited.

It is preferable that the pad 62 electrically connected to the first end of the second electrode 12 is positioned above the first insulating region 21a. For example, the wiring 63 is formed by wire bonding. When the wiring 63 is joined to the pad 62, the pad 62 is pressed downward. When the strength in the region below the pad 62 is low, the isolator 100 may be broken during manufacturing. By providing the pad 62 above the first insulating region 21a, the strength of a region pressed during the joining of the wiring 63 can be improved. As a result, the yield of the isolator 100 can be improved.

Figure 9:
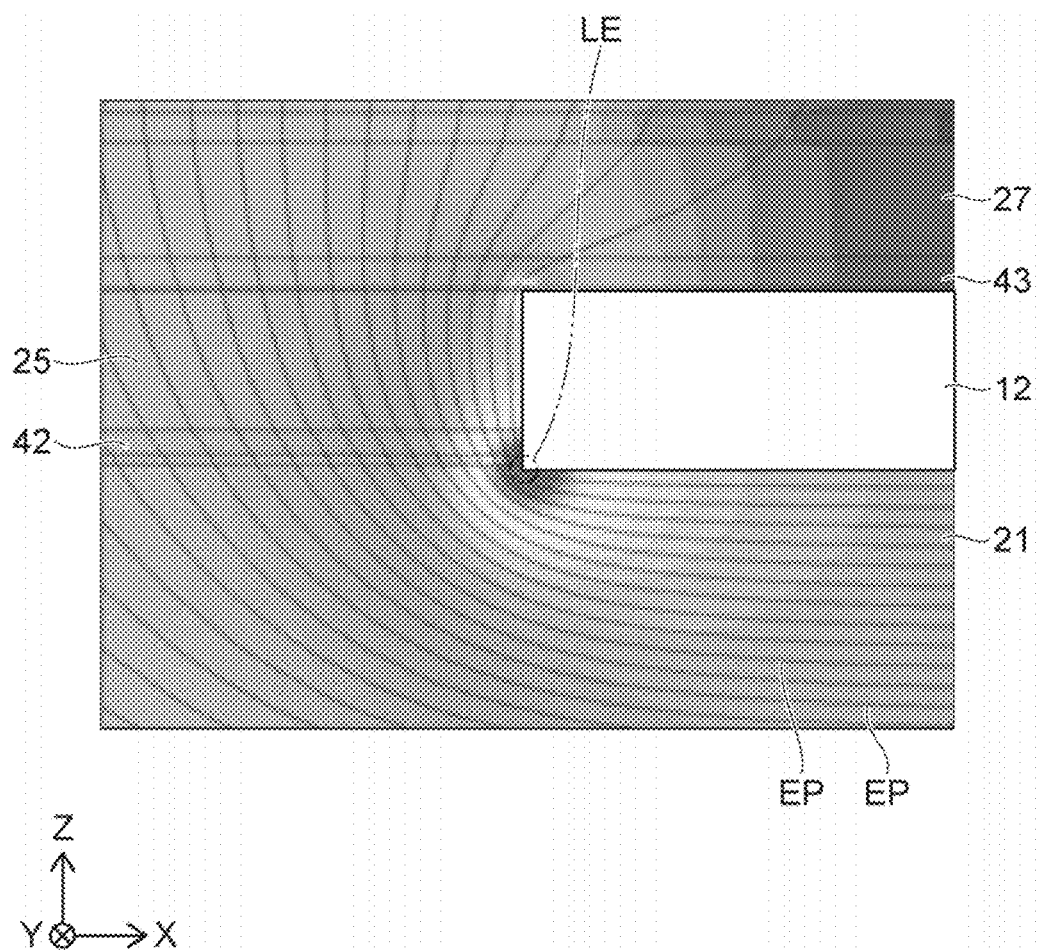
FIG. 9 is a schematic diagram illustrating certain characteristics of an isolator according to a first embodiment.

FIG. 9 is a schematic diagram illustrating characteristics of the isolator according to the first embodiment.

In FIG. 9, the second electrode 12 having a spiral shape is schematically illustrated in a plate shape. In FIG. 9, an equipotential line EP is illustrated in the vicinity of the outer circumference of the second electrode 12.

When a voltage is applied to the second electrode 12, as illustrated in FIG. 9, in a lower end LE of the outer circumference of the second electrode 12, the interval between the equipotential lines EP is narrow, and the electric field concentrates. When the field intensity is excessively high, dielectric breakdown occurs in the vicinity of the lower end LE, and the isolator 100 is broken.

The relative dielectric constant of the third insulating region 21c may be the same as the relative dielectric constant of the second insulating region 21b but is preferably higher than the relative dielectric constant of the second insulating region 21b. When the relative dielectric constant of the third insulating region 21c is higher than the relative dielectric constant of the second insulating region 21b, the equipotential line EP in the third insulating region 21c is likely to spread along the X-Y surface. As a result, the field intensity in the vicinity of the lower end LE of the second electrode 12 can be reduced. The possibility that the isolator 100 is broken due to the concentration of the electric field can be reduced.

For example, the second insulating region 21b and the third insulating region 21c include oxygen and silicon. The third insulating region 21c further includes nitrogen. The second insulating region 21b may or may not include nitrogen. The nitrogen concentration in the third insulating region 21c is higher than the nitrogen concentration in the second insulating region 21b. As a result, the relative dielectric constant of the third insulating region 21c can be made higher than the relative dielectric constant of the second insulating region 21b. The nitrogen concentrations may be compared to each other, for example, by secondary ion mass spectroscopy (SIMS) or energy dispersive x-ray spectroscopy (EDX).

FIG. 10 is a cross-sectional view of apart of the isolator according to the first embodiment.

As illustrated in FIG. 10, the gap 30 may include a first space 31 and a second space 32. The second space 32 is provided around the first space 31 along the X-Y surface. That is, the first space 31 is provided on the inner circumferential side of the gap 30. The second space 32 is provided on the outer circumferential side of the gap 30 closer to a side surface of the isolator. The first space 31 may be referred to as an inner region and the second space 32 may be referred to as an outer region. A dimension D2 of the second space 32 in the Z direction is longer than a dimension D1 of the first space 31 in the Z direction. For example, the hole 35 is connected to the second space 32.

In the step illustrated in FIG. 7A, gas or chemicals are supplied through the opening OP6 in order to remove the sacrificial layer SL. At this time, the insulating layers IL2 and IL3 are slightly removed by the gas or the chemicals. The sacrificial layer SL is removed in order from a portion closest to the opening OP6. In the insulating layer IL2 and IL3, a portion closer to the opening OP6 is exposed to the gas or the chemicals for a longer time. As a result, as illustrated in FIG. 10, the first space 31 and the second space 32 having different dimensions in the Z direction are formed.

By providing the second space 32 on the outer circumferential side of the gap 30, the field intensity of the lower end LE can be reduced. In order to further reduce the field intensity, it is preferable that the second space 32 is aligned with the outer circumference of the second electrode 12 in the Z direction. In addition, by providing the first space 31 on the inner circumferential side of the gap 30, the strength between the first electrode 11 and the second electrode 12 can be improved. For example, the strength of the region pressed during the joining of the wiring 63 is improved. As a result, the yield of the isolator 100 can be improved.

From the viewpoints of reducing the capacitance and maintaining the strength, it is preferable that the dimension of the gap 30 in the Z direction is 0.15 times to 0.4 times the distance between the first electrode 11 and the second electrode 12. When the dimension of the gap 30 in the Z direction varies in the X direction and the Y direction, it is preferable that the longest dimension is in the above-described range.

For example, the length of the third insulating region 21c in the Z direction is shorter than the length of the second insulating region 21b in the Z direction. That is, the distance between the second electrode 12 and the gap 30 in the Z direction is shorter than the distance between the first electrode 11 and the gap 30 in the Z direction. In this case, the depth of the opening OP6 for forming the gap 30 can be reduced. The formation of the gap 30 is easy, and the yield of the isolator 100 can be improved.

The length of the third insulating region 21c in the Z direction may be longer than the length of the second insulating region 21b in the Z direction. That is, the distance between the second electrode 12 and the gap 30 in the Z direction may be longer than the distance between the first electrode 11 and the gap 30 in the Z direction. In this case, the gap 30 can be further spaced from the second electrode 12. By spacing the gap 30 having a low relative dielectric constant from the second electrode 12, the field intensity in the vicinity of the lower end LE can be reduced.

The gap 30 and the hole 35 may be connected to an external space of the isolator 100. It is preferable that the gap 30 and the hole 35 are separated from an external space of the isolator 100. For example, the pressures of the gap 30 and the hole 35 are lower than the atmospheric pressure. Alternatively, the concentration of inert gas in the gap 30 and the hole 35 is higher than the concentration of inert gas in the atmosphere. As a result, when a voltage is applied between the first electrode 11 and the second electrode 12, discharge can be inhibited in the gap 30 and the hole 35. The inert gas is, for example, gas of at least one selected from the group consisting of helium, neon, argon, krypton, xenon, and nitrogen.

MODIFICATION EXAMPLES

FIGS. 11 to 14 are cross-sectional views of parts of isolators according to modification examples of the first embodiment.

Figure 11:
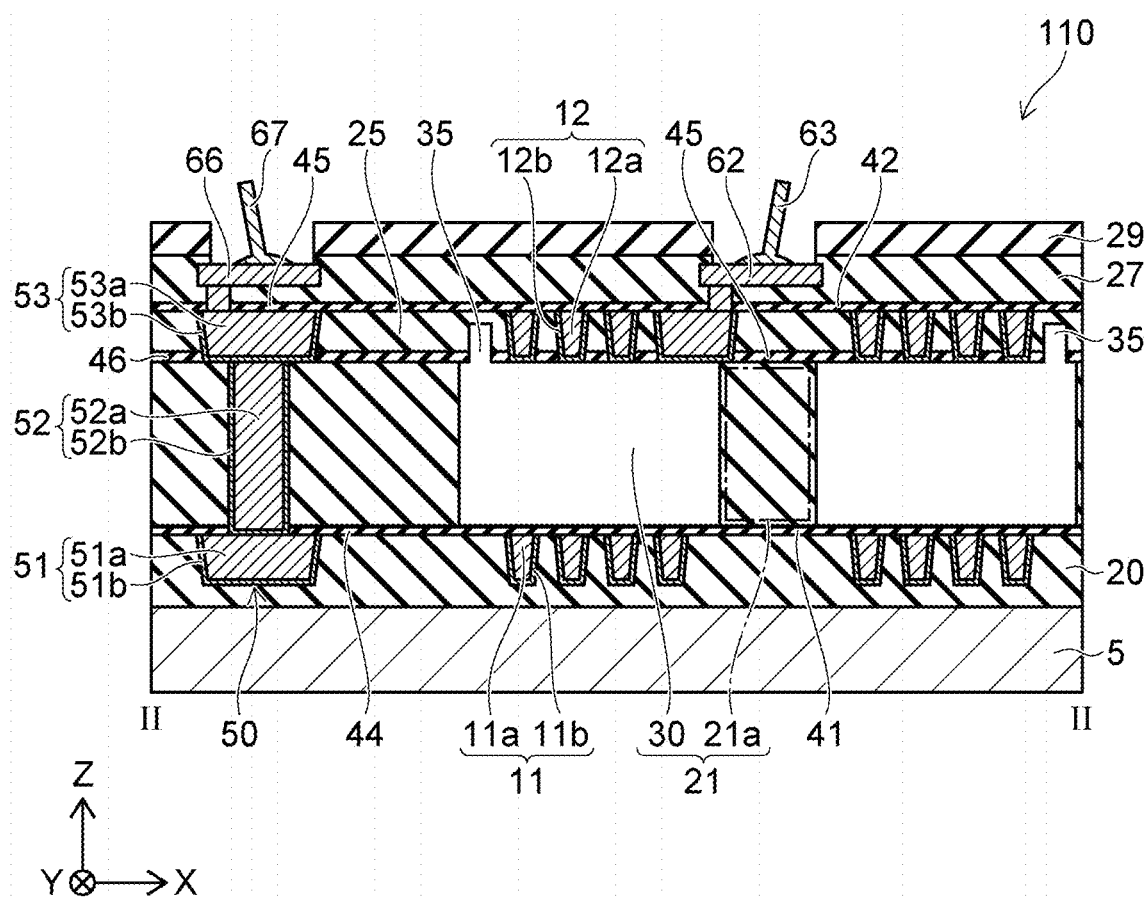
FIG. 11 is a cross-sectional view of a part of an isolator according to a modification example of the first embodiment.
Figure 13:
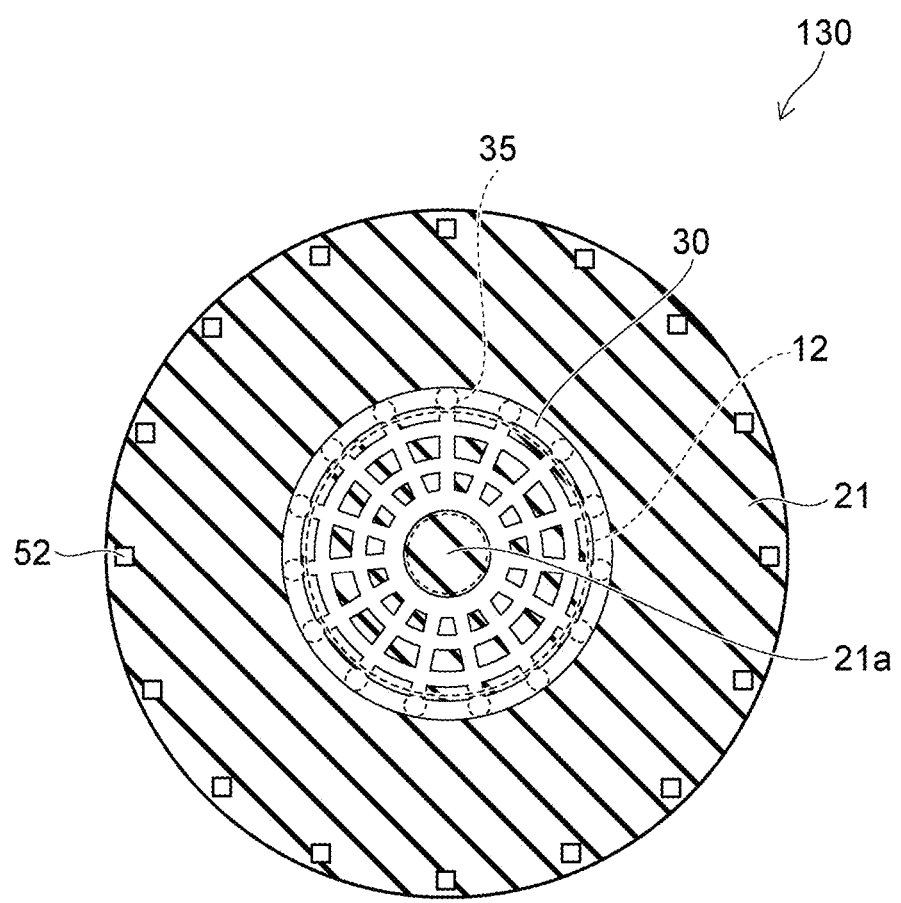
FIG. 13 is a cross-sectional view of a part of an isolator according to another modification example of the first embodiment.

In isolator 110 illustrated in FIG. 11, the second insulating region 21b and the third insulating region 21c are not provided. A lower surface of the second electrode 12 is exposed to the gap 30. An upper surface of the first electrode 11 or the insulating layer 41 is exposed to the gap 30.

In the isolator 110, the capacitance between the first electrode 11 and the second electrode 12 can be further reduced as compared to the isolator 100. On the other hand, in the isolator 100, the strength can be further increased as compared to the isolator 110. In addition, in the isolator 100, the possibility of discharge in the gap 30 can be further reduced as compared to the isolator 110.

In an isolator 120 illustrated in FIG. 12, the gap 30 is provided in a spiral shape along the X-Y surface. In an isolator 130 illustrated in FIG. 13, the gap 30 is radially provided along the X-Y surface from the first insulating region 21a toward the outside. In other words, the gap 30 extends radially away from the first insulating region 21a. In the isolators 120 and 130, a part of the first insulating portion 21 is provided in a clearance between the gaps 30. In the isolators 120 and 130, the strength can be further increased as compared to the isolator 100. On the other hand, in the isolator 100, the capacitance between the first electrode 11 and the second electrode 12 can be further reduced as compared to the isolators 120 and 130.

Figure 14:
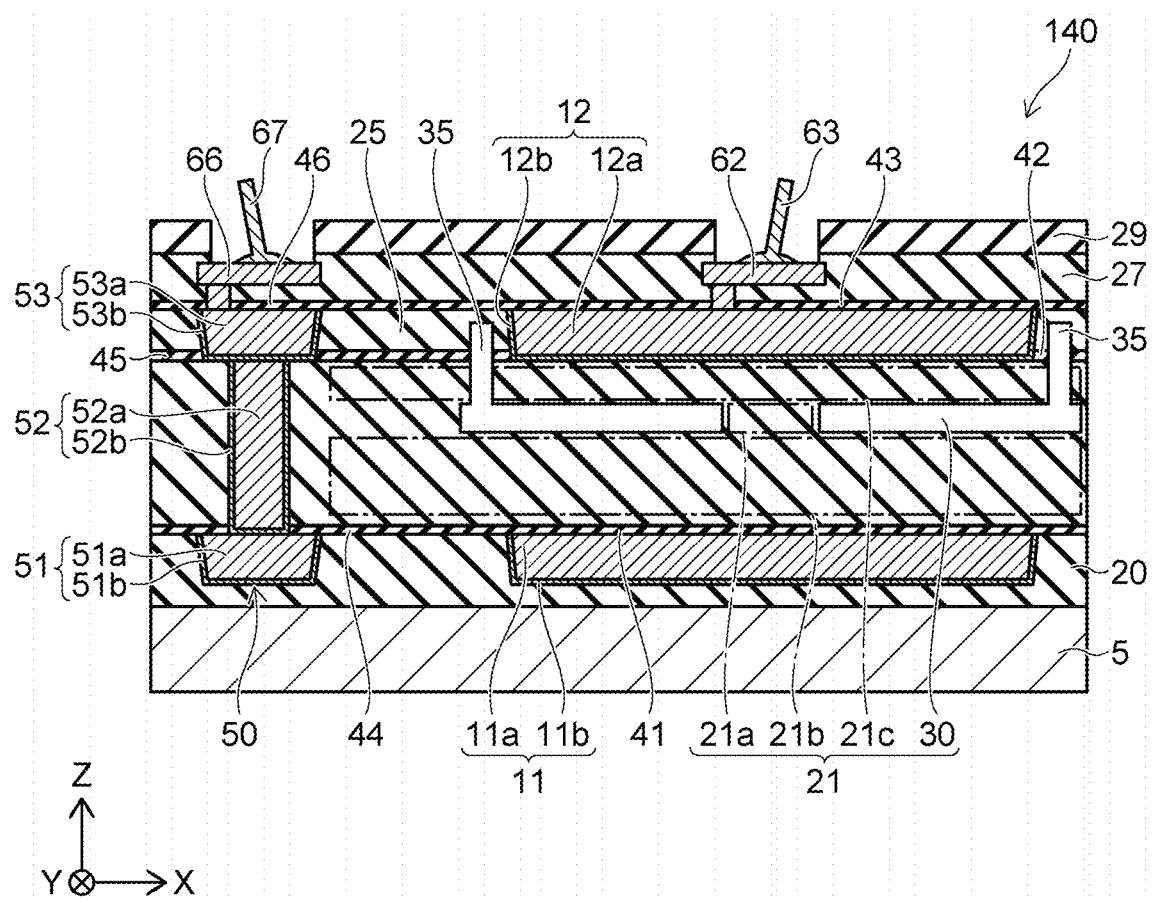
FIG. 14 is a cross-sectional view illustrating a part of an isolator according to still another modification example of the first embodiment.

In an isolator 140 illustrated in FIG. 14, the first electrode 11 and the second electrode 12 are flat instead of being spiral. In other words, each of the first electrode 11 and the second electrode 12 is a planar, flat-plate shape. For example, the first electrode 11 and the second electrode 12 are provided such that the upper surface of the first electrode 11 and the lower surface of the second electrode 12 are parallel to each other.

The isolator 140 transmits a signal using a change in electric field instead of using a change in magnetic field. Specifically, when the second circuit 2 applies a voltage to the second electrode 12, an electric field is generated between the first electrode 11 and the second electrode 12. In the first electrode 11, charge corresponding to the field intensity is stored. The first circuit 1 detects the flow of charge at this time and generates a signal based on the detection result. As a result, a signal is transmitted between the first electrode and the second electrode 12 without transmission of electrical current therebetween.

As a structure of the isolator 140, the same structure as that of the isolator 100 is applicable except for the structure regarding the first electrode 11 and the second electrode 12. In the isolator 140, as in the isolator 100, CMTI can be improved while inhibiting an increase in capacitance between the first electrode 11 and the second electrode 12. Alternatively, the size of each of the first electrode 11 and the second electrode 12 can be reduced while maintaining CMTI.

Figure 15:
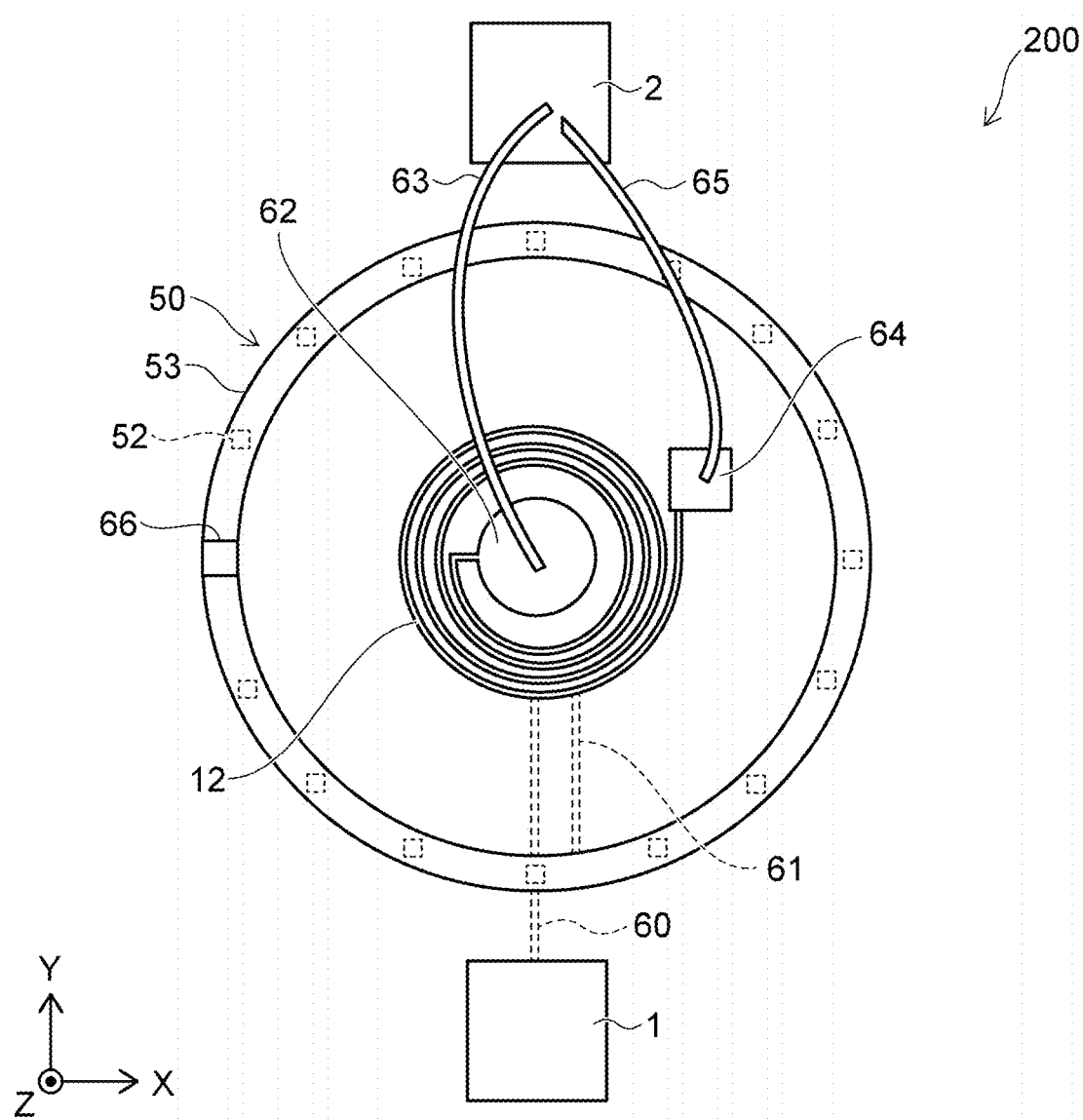
FIG. 15 is a plan view of an isolator according to a second embodiment.

FIG. 15 is a plan view of an isolator according to a second embodiment.

Figure 16:
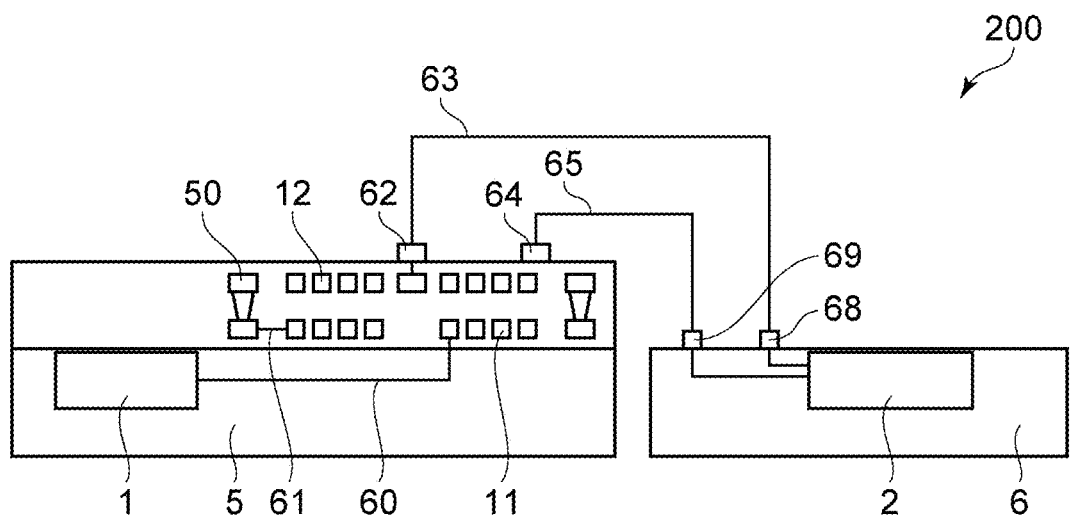
FIG. 16 is a schematic diagram illustrating a cross-sectional structure of an isolator according to a second embodiment.

FIG. 16 is a schematic diagram illustrating a cross-sectional structure of the isolator according to the second embodiment.

In an isolator 200 according to the second embodiment, as illustrated in FIG. 15, the first end of the first electrode 11 is electrically connected to the conductor 50 through the wiring 61. The second end of the first electrode 11 is electrically connected to the first circuit 1 through the wiring 60.

As illustrated in FIG. 16, the first circuit 1 is provided in the substrate 5. The second circuit 2 is provided in a substrate 6 spaced from the substrate 5. The pad 62 is electrically connected to a pad 68 provided above the substrate 6 through the wiring 63. The pad 64 is electrically connected to a pad 69 provided above the substrate 6 through the wiring 65. The second circuit 2 is electrically connected to the pads 68 and 69.

In the isolator 200, the structure according to each of the embodiments described above is applicable to a structure above the substrate 5. As a result, for example, the CMTI of the isolator 200 can be improved.

Figure 17:
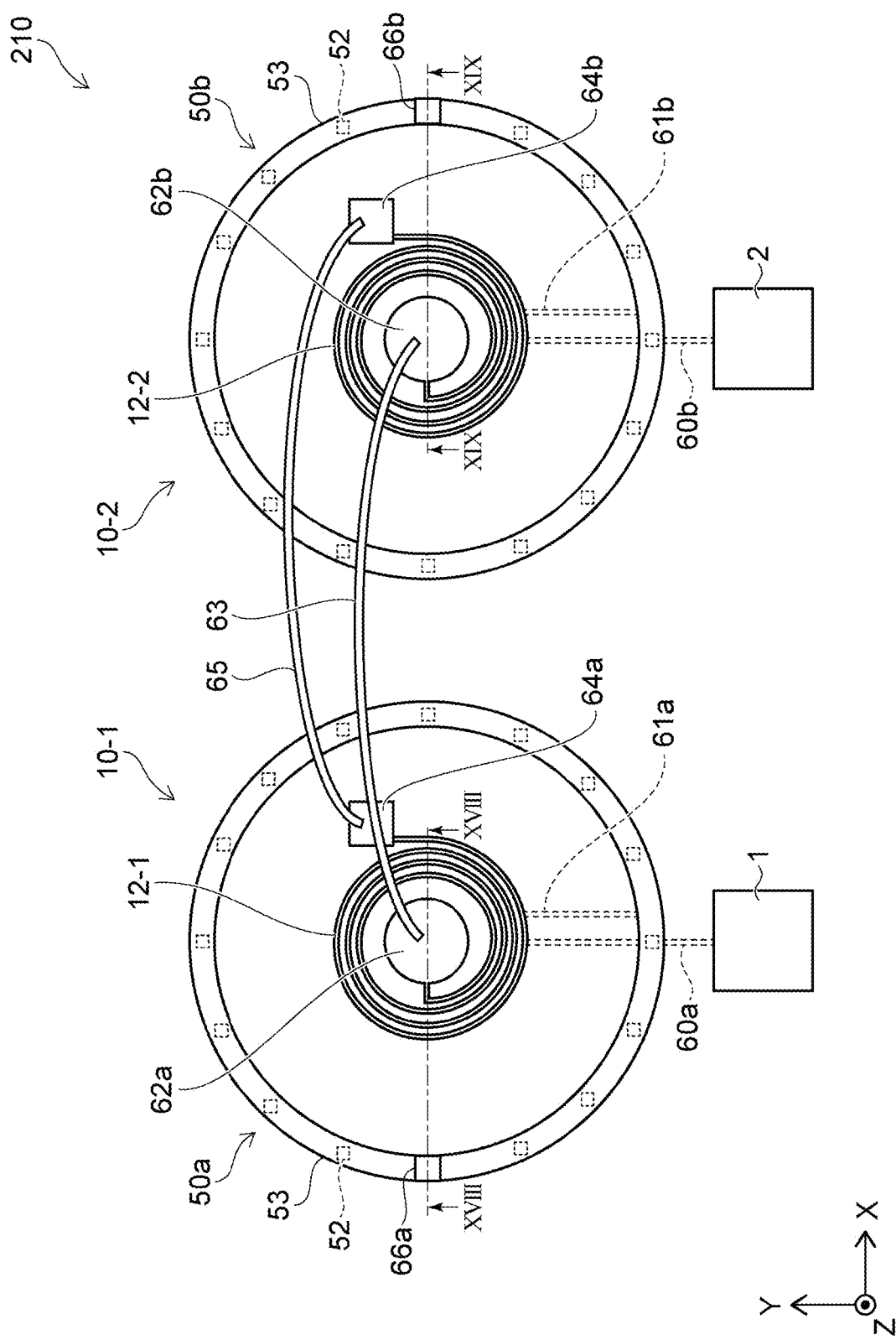
FIG. 17 is a plan view of an isolator according to a first modification example of the second embodiment.

FIG. 17 is a plan view of an isolator according to a first modification example of the second embodiment.

Figure 18:
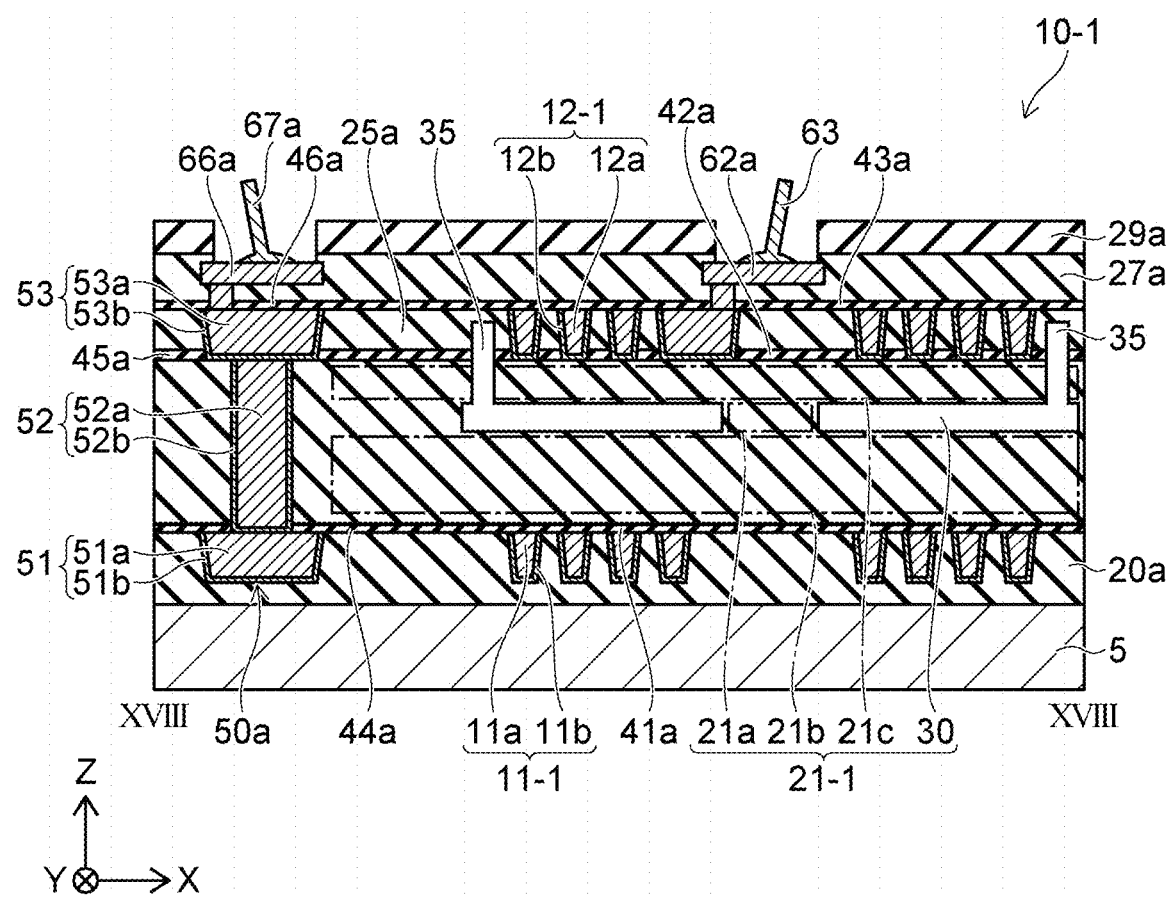
FIG. 18 is a cross-sectional view of an isolator taken along a line XVIII-XVIII in FIG. 17.
Figure 19:
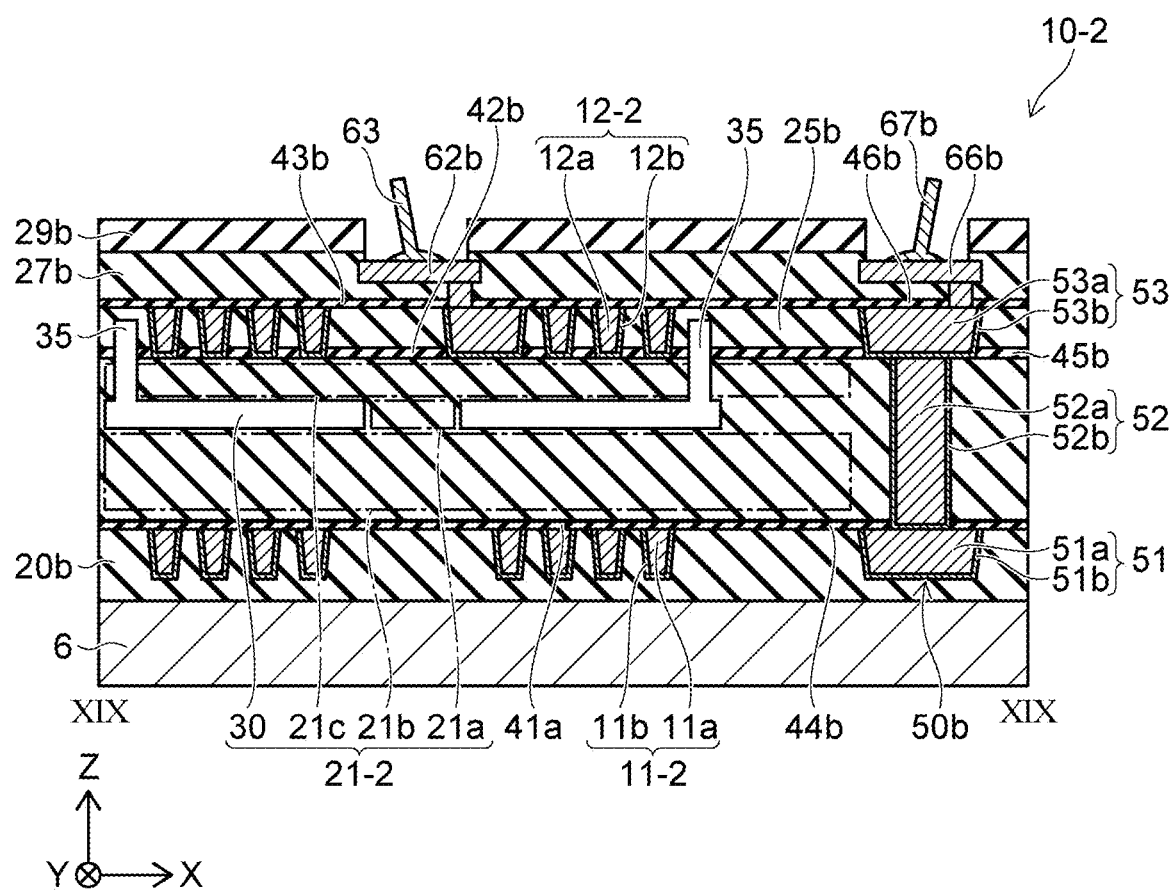
FIG. 19 is a cross-sectional view of an isolator taken along a line XIX-XIX in FIG. 17.

FIG. 18 is a cross-sectional view of an isolator taken along a line XVIII-XVIII in FIG. 17. FIG. 19 is a cross-sectional view of an isolator taken along a line XIX-XIX in FIG. 17.

Figure 20:
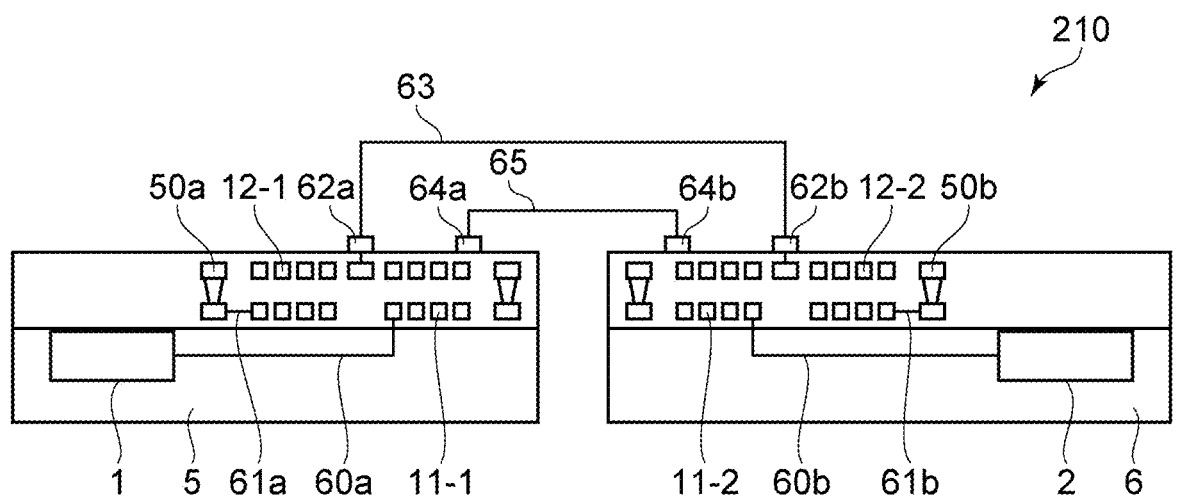
FIG. 20 is a schematic diagram illustrating a cross-sectional structure of an isolator according to the first modification example of a second embodiment.

FIG. 20 is a schematic diagram illustrating a cross-sectional structure of the isolator according to the first modification example of the second embodiment.

An isolator 210 according to the first modification example includes a first structure 10-1 and a second structure 10-2 as illustrated in FIG. 17.

As illustrated in FIGS. 17, 18, and 20, the first structure 10-1 includes an electrode 11-1, an electrode 12-1, an insulating portion 20a, an insulating portion 21-1, an insulating portion 25a, an insulating portion 27a, an insulating portion 29a, insulating layers 41a to 46a, a conductor 50a, a pad 62a, a pad 64a, and a pad 66a. The structures of these components are the same as those of the first electrode 11, the second electrode 12, the insulating portion 20, the first insulating portion 21, the insulating portions 25, 27, and 29, the insulating layers 41 to 46, the conductor 50, the pad 62, the pad 64, and the pad 66 as illustrated in FIG. 2.

As illustrated in FIGS. 17, 19, and 20, the second structure 10-2 includes an electrode 11-2, an electrode 12-2, an insulating portion 20b, an insulating portion 21-2, an insulating portion 25b, an insulating portion 27b, an insulating portion 29b, insulating layers 41b to 46b, a conductor 50b, a pad 62b, a pad 64b, and a pad 66b. The structures of these components are the same as those of the first electrode 11, the second electrode 12, the insulating portion 20, the first insulating portion 21, the insulating portions 25, 27, and 29, the insulating layers 41 to 46, the conductor 50, the pad 62, the pad 64, and the pad 66 as illustrated in FIG. 2.

As illustrated in FIG. 17, the pad 62a is electrically connected to the pad 62b through the wiring 63. The pad 64a is electrically connected to the pad 64b through the wiring 65.

The pad 66a is electrically connected to another conductive member through a wiring 67a. The pad 66b is electrically connected to another conductive member through a wiring 67b.

As illustrated in FIG. 20, the first circuit 1 is provided in the substrate 5. The first structure 10-1 is provided above the substrate 5. The second circuit 2 is provided in the substrate 6. The second structure 10-2 is provided above the substrate 6. A first end of the electrode 11-1 is electrically connected to the conductor 50a. A second end of the electrode 11-1 is electrically connected to the first circuit 1. A first end of the electrode 11-2 is electrically connected to the conductor 50b. A second end of the electrode 11-2 is electrically connected to the second circuit 2.

In the isolator 210, the structure according to each of the embodiments described above is applicable to a structure above the substrate 5 and a structure above the substrate 6. As a result, for example, the CMTI of the isolator 210 can be improved. In the isolator 210 illustrated in FIGS. 17 to 20, the pair of electrodes 11-1 and 12-1 are connected in series to the pair of electrodes 11-2 and 12-2. In other words, the first circuit 1 and the second circuit 2 are doubly insulated from each other by the two pairs of electrodes connected in series. In the isolator 210, the insulating reliability can be improved as compared to a structure that is singly insulated by the pair of electrodes.

Figure 21:
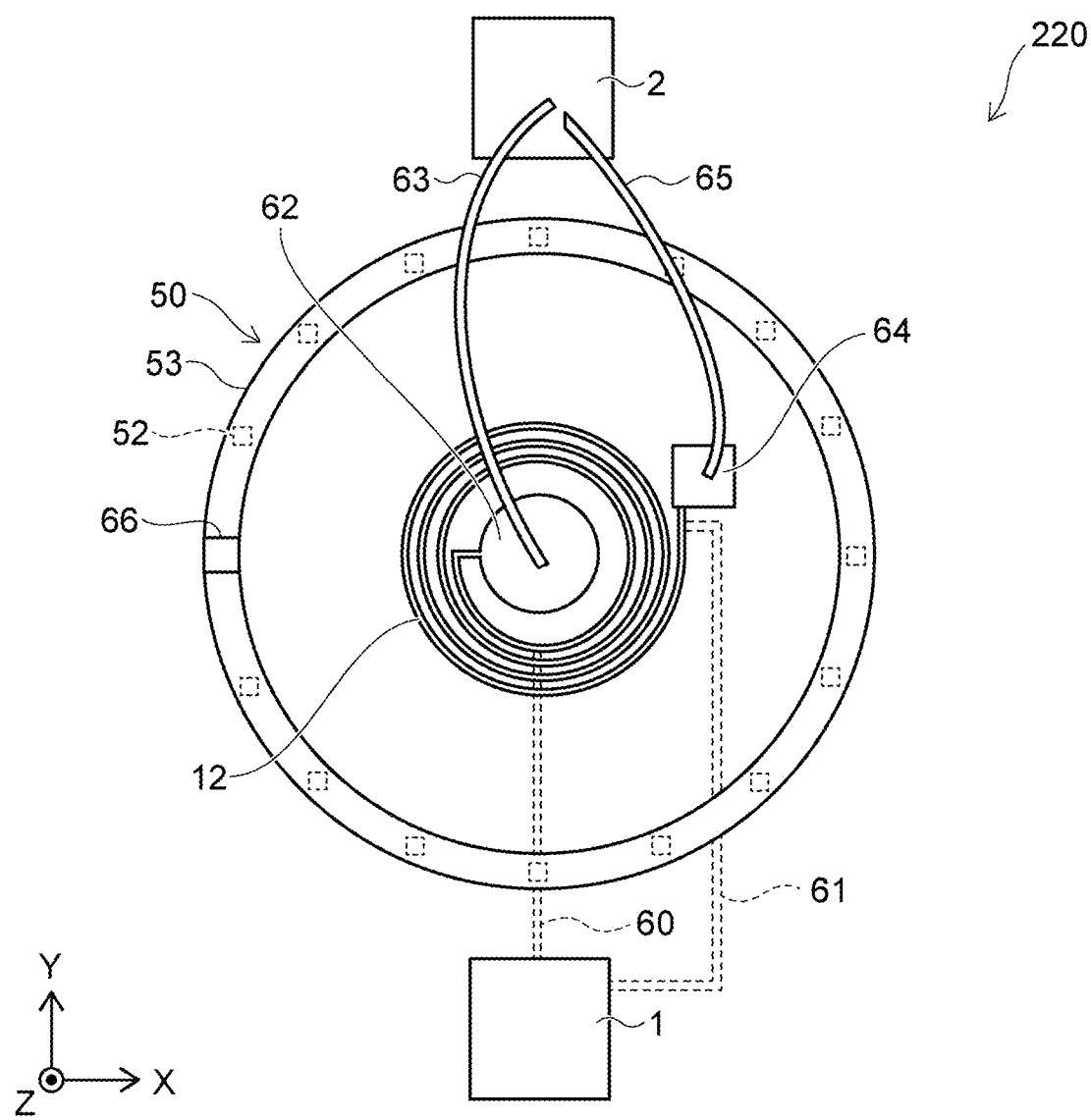
FIG. 21 is a plan view of an isolator according to a second modification example of a second embodiment.

FIG. 21 is a plan view of an isolator according to a second modification example of the second embodiment.

Figure 22:
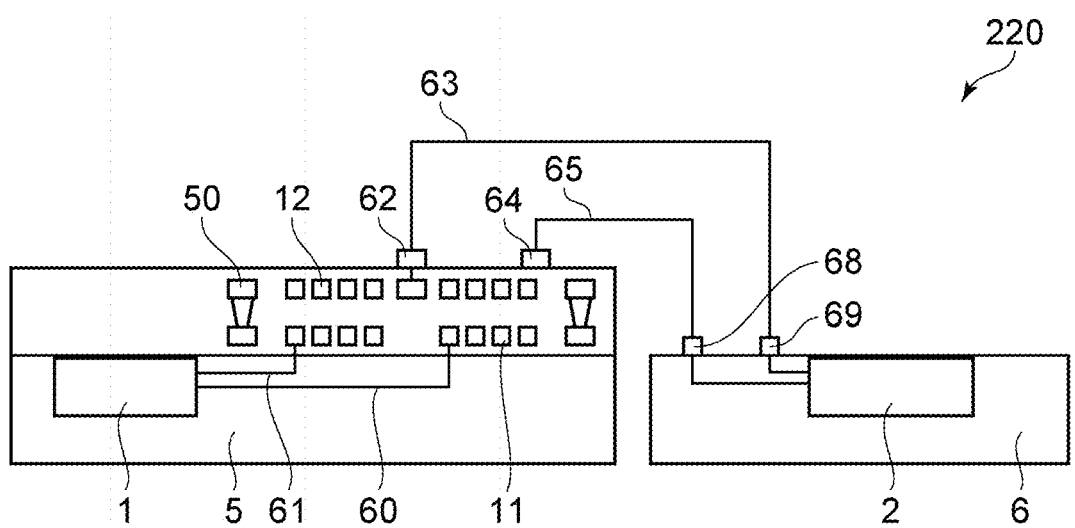
FIG. 22 is a schematic diagram illustrating a cross-sectional structure of an isolator according to the second modification example of a second embodiment.

FIG. 22 is a schematic diagram illustrating a cross-sectional structure of the isolator according to the second modification example of the second embodiment.

An isolator 220 according to the second modification example of the second embodiment is different from the isolator 200, in that both ends of the first electrode 11 are electrically connected to the first circuit 1 as illustrated in FIGS. 21 and 22. The conductor 50 is electrically isolated from the first circuit 1 and the first electrode 11. As long as the conductor 50 is set to the reference potential, an electrical connection relationship between the first circuit 1, the first electrode 11, and the conductor 50 can be appropriately changed.

Figure 23:
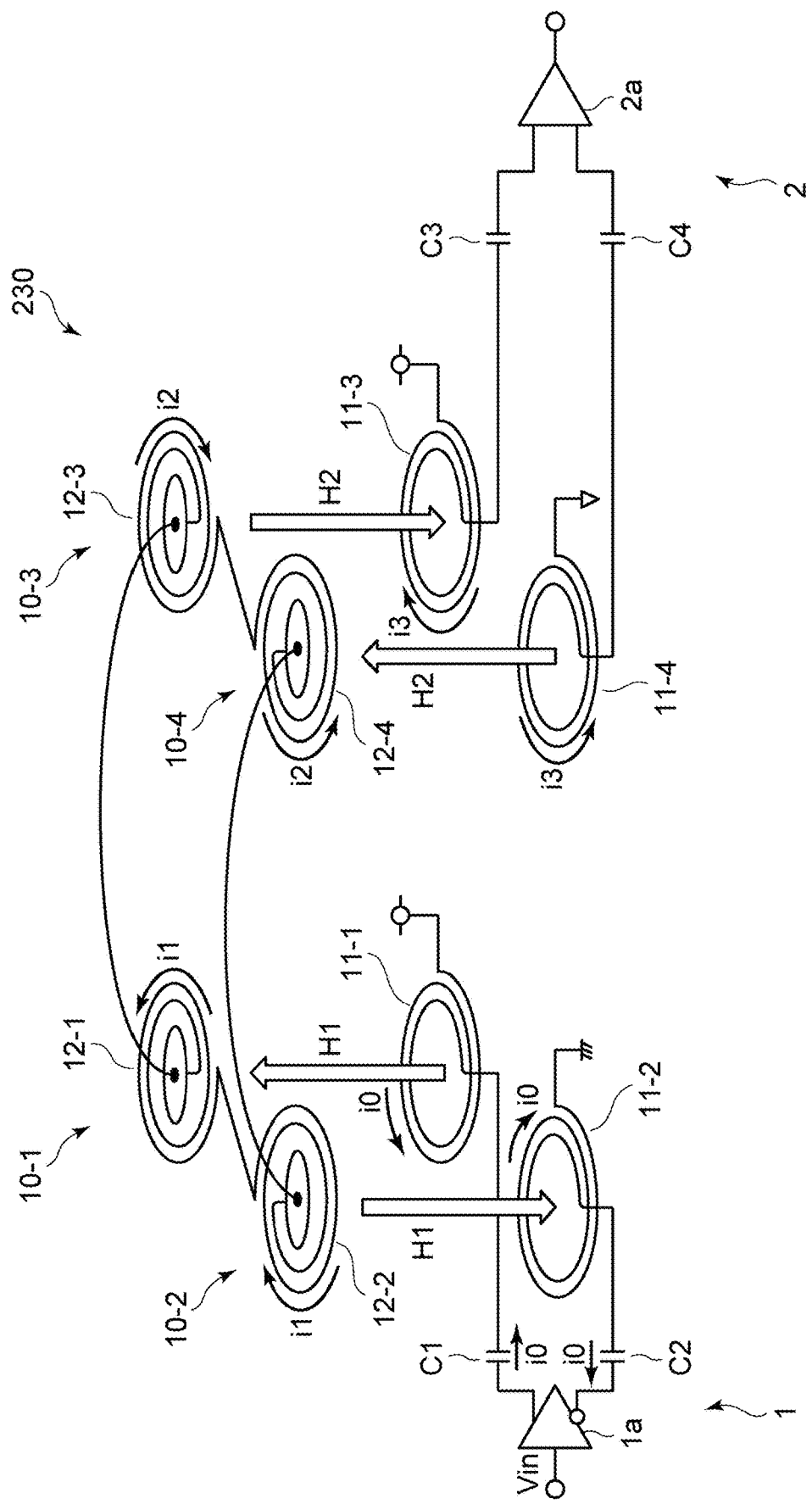
FIG. 23 is a schematic diagram illustrating an isolator according to a third modification example of a second embodiment.

FIG. 23 is a schematic diagram illustrating an isolator according to a third modification example of the second embodiment.

An isolator 230 according to the third modification example includes the first structure 10-1, the second structure 10-2, a third structure 10-3, and a fourth structure 10-4. The first structure 10-1 includes the electrodes 11-1 and 12-1. The second structure 10-2 includes the electrodes 11-2 and 12-2. The third structure 10-3 includes electrodes 11-3 and 12-3. The fourth structure 10-4 includes electrodes 11-4 and 12-4. These electrodes are coils. The first circuit 1 includes a differential driver circuit 1a, a capacitor C1, and a capacitor C2. The second circuit 2 includes a differential receiver circuit 2a, a capacitor C3, and a capacitor C4.

For example, the differential driver circuit 1a, the capacitor C1, the capacitor C2, the electrode 11-1, the electrode 11-2, the electrode 12-1, and the electrode 12-2 are formed on a first substrate. The first end of the electrode 11-1 is connected to a first constant potential. The second end of the electrode 11-2 is connected to the capacitor C1. The first end of the electrode 11-2 is connected to a second constant potential. The second end of the electrode 11-2 is connected to the capacitor C2.

One output of the differential driver circuit 1a is connected to the capacitor C1. A second output of the differential driver circuit 1a is connected to the capacitor C1. The capacitor C1 is connected between the differential driver circuit 1a and the electrode 11-1. The capacitor C2 is connected between the differential driver circuit 1a and the electrode 11-2.

The electrode 11-1 and the electrode 12-1 are stacked with an insulating portion interposed therebetween. The electrode 11-2 and the electrode 12-2 are stacked with another insulating portion interposed therebetween. A first end of the electrode 12-1 is connected to a first end of the electrode 12-2.

For example, the differential receiver circuit 2a, the capacitor C3, the capacitor C4, the electrode 11-3, the electrode 11-4, the electrode 12-3, and the electrode 12-4 are formed on a second substrate. A first end of the electrode 11-3 is connected to a third constant potential. A second end of the electrode 11-3 is connected to the capacitor C3. A first end of the electrode 11-4 is connected to a fourth constant potential. A second end of the electrode 11-4 is connected to the capacitor C4.

A first input of the differential receiver circuit 2a is connected to the capacitor C3. A second input of the differential receiver circuit 2a is connected to the capacitor C4. The electrode 11-3 and the electrode 12-3 are stacked with an insulating portion interposed therebetween. The electrode 11-4 and the electrode 12-4 are stacked with another insulating portion interposed therebetween. A first end of the electrode 12-3 is connected to a first end of the electrode 12-4.

The operation will be described. In the isolator, a modulated signal is transmitted. In FIG. 23, Vin represents a modulated signal. For the signal modulation, for example, an edge trigger method or ON-OFF Keying method is used.

In any of the methods, Vin represents a signal obtained by shifting an original signal to a high frequency band.

The differential driver circuit 1a causes currents i0 to flow to the electrodes 11-1 and 11-2 in opposite directions according to Vin. The electrodes 11-1 and 11-2 generate magnetic fields (H1) in opposite directions. When the number of turns of the electrode 11-1 is the same as that of the electrode 11-2, the sizes of the generated magnetic fields are the same as each other.

An induced voltage generated in the electrode 12-1 due to the magnetic field H1 is added to an induced voltage generated in the electrode 12-2 due to the magnetic field H1. Currents i1 flow through the electrodes 12-1 and 12-2. A second end of the electrode 12-1 is connected to a second end of the electrode 12-3 through a bonding wire. A second end of the electrode 12-2 is connected to a second end of the electrode 12-4 through another bonding wire. The bonding wire includes, for example, gold. The diameter of the bonding wire is, for example, 30 µm.

The induced voltage added in the electrodes 12-1 and 12-2 is applied to the electrodes 12-3 and 12-4. Currents i2 having the same current value as the current i1 flow through the electrodes 12-3 and 12-4. The electrodes 12-3 and 12-4 generate magnetic fields (H2) in opposite directions. When the number of turns of the electrode 12-3 is the same as that of the electrode 12-4, the sizes of the generated magnetic fields are the same as each other.

A direction of an induced voltage generated in the electrode 11-3 due to the magnetic field H2 is opposite to a direction of an induced voltage generated in the electrode 11-4 due to the magnetic field H2. Currents i3 flow through the electrodes 11-3 and 11-4. In addition, the size of the induced voltage generated in the electrode 11-3 is the same as the size of the induced voltage generated in the electrode 11-4. The induced voltages generated in the electrodes 11-3 and 11-4 are added, and the added induced voltage is applied to the differential receiver circuit 2a such that a modulated signal is transmitted.

Figure 24:
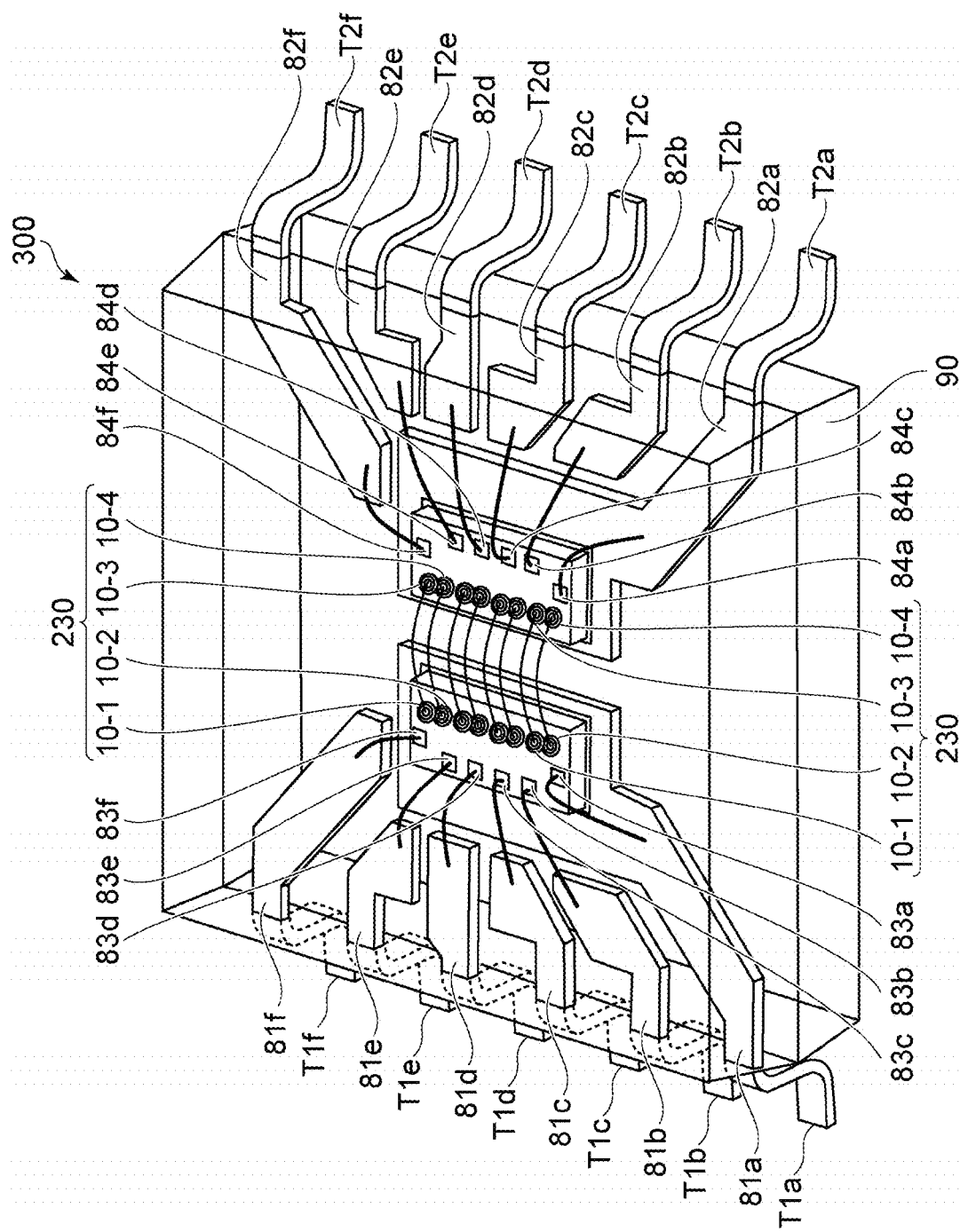
FIG. 24 is a perspective view of a packaged device according to a third embodiment.

FIG. 24 is a perspective view of a package according to a third embodiment.

FIG. 25 is a schematic diagram illustrating a cross-sectional structure of the package according to the third embodiment.

As illustrated in FIG. 24, a package 300 according to the third embodiment includes metal members 81a to 81f, metal members 82a to 82f, pads 83a to 83f, pads 84a to 84f, a sealing portion 90, and a plurality of isolators 230.

In the example illustrated in the drawing, the package 300 includes four isolators 230. That is, four sets including first structures 10-1 to fourth structures 10-4 illustrated in FIG. 23 are provided.

The first structures 10-1 and the second structures 10-2 are provided on a part of the metal member 81a. For example, the first structures 10-1 and the second structures 10-2 are provided on one substrate 5. The substrate 5 is electrically connected to the metal member 81a. In the substrate 5, a plurality of first circuits 1 are provided. One first circuit 1 is provided corresponding to a set including one first structure 10-1 and one second structure 10-2.

The third structures 10-3 and the fourth structures 10-4 are provided on a part of the metal member 82a. The third structures 10-3 and the fourth structures 10-4 are provided on one substrate 6. The substrate 6 is electrically connected to the metal member 82a. In the substrate 6, a plurality of second circuits 2 are provided. One second circuit 2 is provided corresponding to a set including one third structure 10-3 and one fourth structure 10-4.

The metal member 81a is further electrically connected to the pad 83a. The pad 83a is electrically connected to conductors 50a of each of the first structures 10-1 and each of the second structures 10-2. The metal member 82a is further electrically connected to the pad 84a. The pad 84a is electrically connected to conductors 50b of each of the third structures 10-3 and each of the fourth structures 10-4.

The metal members 81b to 81e are electrically connected to the pads 83b to 83e, respectively. The pads 83b to 83e are electrically connected to the first circuits 1, respectively. The metal member 81f is electrically connected to the pad 83f. The pad 83f is electrically connected to the first circuits 1.

The metal members 82b to 82e are electrically connected to the pads 84b to 84e, respectively. The pads 84b to 84e are electrically connected to the second circuits 2, respectively. The metal member 82f is electrically connected to the pad 84f. The pad 84f is electrically connected to the second circuits 2.

The sealing portion 90 covers parts of the metal members 81a to 81f and 82a to 82f, the pads 83a to 83f, the pads 84a to 84f, and the isolators 230.

The metal members 81a to 81f include terminals T1a to T1f, respectively. The metal members 82a to 82f include terminals T2a to T2f, respectively. The terminals T1a to T1f and T2a to T2f are exposed to the outside without being covered with the sealing portion 90.

For example, the terminals T1a and T2a are connected to a reference potential. Signals to the first circuits 1 are input to the terminals T1b to T1e, respectively. Signals from the second circuits 2 are output to the terminals T2b to T2e, respectively. The terminal T1f is connected to a power supply for driving the first circuits 1. The terminal T2f is connected to a power supply for driving the second circuits 2.

In the third embodiment, CMTI of the isolators in the package 300 can be improved. As a result, the characteristics of the package 300 can be improved. Here, the example where four isolators 230 are provided is described. However, one or more other isolators may be provided in the package 300.

In the example embodiments described above, the characteristics of the isolator are improved. The improvement (s) include, for example, a decrease in capacitance between the first electrode 11 and the second electrode 12, improvement of CMTI, a decrease in leakage current between the first electrode 11 and the second electrode 12, improvement in strength, improvement in yield, or improvement of resistance to breakage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. In addition, the above-described embodiments can be combined with each other.

What is claimed is:

1. An isolator, comprising:
 a first insulating layer;
 a first electrode on a first side of the first insulating layer;
 a second electrode on a second side of the first insulating layer opposite to the first side, the second electrode facing the first electrode across the first insulating layer; and
 a second insulating layer in which the second electrode is provided, wherein
 the first insulating layer includes a cavity between the first electrode and the second electrode and a first plurality of holes extending from the cavity toward the second side, the cavity extending along a plane perpendicular to a top-to-bottom direction of the first insulating layer, and the second insulating layer includes a second plurality of holes in a region around the second electrode, the second plurality of holes in the second insulating layer connecting with the first plurality of holes in the first insulating layer.

2. The isolator according to claim 1, wherein
the first insulating layer includes a center region around which the cavity is formed,
the isolator further comprises a pad electrically connected to the second electrode, and
the pad is above the center region.

3. The isolator according to claim 1, wherein the first insulating layer includes a first region between the cavity and the first electrode and a second region between the cavity and the second electrode.

4. The isolator according to claim 3, wherein a relative dielectric constant of the first region is less than a relative dielectric constant of the second region.

5. The isolator according to claim 1, wherein the second electrode is exposed to the cavity.

6. The isolator according to claim 1, wherein in a cross section along the top-to-bottom direction, a thickness of the cavity at a first region is greater than a thickness of the cavity at a second region that is closer to a side surface of the isolator than is the first region.

7. The isolator according to claim 1, wherein the cavity has a loop shape.

8. The isolator according to claim 1, wherein the cavity has a spiral shape.

9. The isolator according to claim 1, wherein the cavity extends in a radial direction from a center region of the first insulating layer.

10. The isolator according to claim 1, wherein
the first electrode has a spiral shape, and
the second electrode has a spiral shape.

11. The isolator according to claim 1, wherein
the first electrode has a flat-plate shape, and
the second electrode has a flat-plate shape.

12. An electronic device, comprising:
a transmitter circuit;
a receiver circuit; and
an isolator configured to receive a first signal from the transmitter circuit and transmit a second signal corresponding to the first signal to the receiver circuit, the isolator comprising:
a first insulating layer;
a first electrode provided on a first side of the first insulating layer;
a second electrode provided on a second side of the first insulating layer opposite to the first side, the second electrode facing the first electrode across the first insulating layer; and
a second insulating layer in which the second electrode is provided, wherein the first insulating layer includes therein a cavity between the first electrode and the second electrode and a first plurality of holes extending from the cavity toward the second side, the cavity extending along a plane perpendicular to a top-to-bottom direction of the first insulating layer, and
the second insulating layer includes a second plurality of holes in a region around the second electrode, the second plurality of holes in the second insulating layer connecting with the first plurality of holes in the first insulating layer.

13. The electronic device according to claim 12, wherein the transmitter circuit is connected to one of the first and second electrodes, and the receiver circuit is connected to the other of the first and second electrodes.

14. The electronic device according to claim 12, wherein
the transmitter circuit is provided in a first substrate,
the receiver circuit is provided in a second substrate, and
the isolator is provided on one of the first and second substrates.

15. An isolator, comprising:
an insulating layer;
a first electrode on a first side of the insulating layer; and
a second electrode on a second side of the insulating layer opposite to the first side, the second electrode facing the first electrode across the insulating layer, wherein
the insulating layer includes a cavity between the first electrode and the second electrode, the cavity extending along a plane perpendicular to a top-to-bottom direction of the insulating layer, and
an inert gas is contained in the cavity, and a concentration of the inert gas in the cavity is greater than a concentration of the inert gas in the atmosphere.

16. The isolator according to claim 15, wherein
the insulating layer includes a center region around which the cavity is formed,
the isolator further comprises a pad electrically connected to the second electrode, and
the pad is above the center region.

17. The isolator according to claim 15, wherein the insulating layer includes a first region between the cavity and the first electrode and a second region between the cavity and the second electrode.

18. The isolator according to claim 17, wherein a relative dielectric constant of the first region is less than a relative dielectric constant of the second region.

19. The isolator according to claim 15, wherein the second electrode is exposed to the cavity.

20. The isolator according to claim 15, wherein in a cross section along the top-to-bottom direction, a thickness of the cavity at a first region is greater than a thickness of the cavity at a second region that is closer to a side surface of the isolator than is the first region.

* * * * *